United States Patent
Naito et al.

(10) Patent No.: US 7,415,398 B2
(45) Date of Patent: Aug. 19, 2008

(54) METHOD OF SIMULATING VISCOELASTIC MATERIAL

(75) Inventors: Masato Naito, Kobe (JP); Masaki Shiraishi, Kobe (JP)

(73) Assignee: Sumitomo Rubber Industries, Ltd., Kobe-Shi (JP)

( * ) Notice: Subject to any disclaimer, the term of this patent is extended or adjusted under 35 U.S.C. 154(b) by 436 days.

(21) Appl. No.: 10/896,862

(22) Filed: Jul. 23, 2004

(65) Prior Publication Data
US 2005/0086034 A1   Apr. 21, 2005

(30) Foreign Application Priority Data

| Oct. 17, 2003 | (JP) | P2003-358167 |
| Oct. 17, 2003 | (JP) | P2003-358168 |
| Nov. 17, 2003 | (JP) | P2003-386992 |
| Jan. 22, 2004 | (JP) | P2004-014699 |

(51) Int. Cl.
*G06G 7/48* (2006.01)

(52) U.S. Cl. ............ 703/6; 703/1; 703/2; 703/11; 720/694; 702/42; 702/127; 702/170

(58) Field of Classification Search ............ 703/2, 703/9, 12, 1, 6; 702/42; 720/694
See application file for complete search history.

(56) References Cited

U.S. PATENT DOCUMENTS

| 5,402,366 | A * | 3/1995 | Kihara et al. | 703/9 |
| 6,199,026 | B1 * | 3/2001 | Shiraishi et al. | 702/140 |
| 6,430,993 | B1 * | 8/2002 | Seta | 73/146 |
| 6,519,536 | B1 * | 2/2003 | Brunacci et al. | 702/50 |
| 6,732,057 | B2 * | 5/2004 | Hamad | 702/42 |
| 6,829,563 | B2 * | 12/2004 | Miyamoto et al. | 702/182 |
| 7,147,367 | B2 * | 12/2006 | Balian et al. | 374/44 |
| 7,203,604 | B2 * | 4/2007 | Mazilu | 702/42 |

(Continued)

FOREIGN PATENT DOCUMENTS

JP   2002-365205 A   12/2002

(Continued)

OTHER PUBLICATIONS

J. S. Bergstrom, M. C. Boyce, Mechanical Behavior of Particle Filled Elastomers, Rubber Chemical Technology, vol. 72, pp. 633-656, 1999.*

(Continued)

*Primary Examiner*—Hugh Jones
*Assistant Examiner*—Kibrom K Gebresilassie
(74) *Attorney, Agent, or Firm*—Birch, Stewart, Kolasch & Birch, LLP

(57) ABSTRACT

The present invention relates to a method of simulating the deformation of a viscoelastic material in which filler is blended to a matrix made of rubber or resin, the method including the steps of dividing the viscoelastic material into a finite number of elements to form a viscoelastic material model, a step of performing deformation calculation of the viscoelastic material model based on a predetermined condition, and a step of acquiring a necessary physical amount from the deformation calculation, where the step of dividing the viscoelastic material into a finite number of elements includes a step of dividing at least one filler into a finite number of elements to form a filler model, and a step of dividing the matrix into a finite number of elements to form a matrix model.

10 Claims, 28 Drawing Sheets

U.S. PATENT DOCUMENTS

| | | | | |
|---|---|---|---|---|
| 7,292,966 | B2* | 11/2007 | Naito | 703/6 |
| 2003/0055494 | A1* | 3/2003 | Bezuidenhout et al. | 623/1.39 |
| 2003/0077478 | A1* | 4/2003 | Dani et al. | 428/673 |
| 2003/0227959 | A1* | 12/2003 | Balian et al. | 374/161 |
| 2004/0073385 | A1* | 4/2004 | Miyamoto et al. | 702/44 |
| 2004/0107081 | A1* | 6/2004 | Miyori et al. | 703/6 |
| 2004/0230411 | A1* | 11/2004 | Zheng et al. | 703/6 |
| 2004/0241410 | A1* | 12/2004 | Fischer et al. | 428/292.1 |
| 2005/0004779 | A1* | 1/2005 | Ueda et al. | 702/182 |
| 2005/0256686 | A1* | 11/2005 | Stabelfeldt et al. | 703/6 |
| 2006/0136151 | A1* | 6/2006 | Shiraishi | 702/42 |

OTHER PUBLICATIONS

J. S. Bergstrom, M.C. Boyce, Large strain time-dependent behavior of filled elastomers, Mechanics of Materials 32 (2000), 627-644, 2000 Elsevier Science Ltd.*

J. S. Bergstrom, and M.C. Boyce, "Mechanical Behavior of Particle Filled Elastomers" Rubber Chemical Technology, vol. 72, pp. 633-656, 1999.*

J. S. Bergstrom, M.C. Boyce, "Large Strain time-dependent behavior of filled elastomers" Mechanics of Material 32 (2000), pp. 627-644.*

P.P.A. Smit, The Glass Transition in Carbon Black Reinforced Rubber, 1966.*

Ellen M. Arruda, et al. "A three-dimensional constitutive model for the large stretch behavior of rubber elastic materials", Journal of Mechanics and the Physics of Solids, vol. 41, No. 2, pp. 389-412.

A. Neddleman, "A continuum Model for void nucleation by inclusion debonding", Journal of Applied Mechanics, vol. 54, pp. 525-531.

Bergstom et al., "Mechanical behavior of particle filled elastomers" Rubber Chemistry and Technology, XP009063213, vol. 72, No. 4, pp. 633-656, (1999).

Drozdov et al., Continuum Mechanics and Thermodynamics, vol. 14, No. 4, pp. 337-361 (2002).

Van Dommelen et al., Computational Materials Science, Vol. 27, No. 4, pp. 480-492 (2003).

Davis et al., Journal of Applied Physics, vol. 85, No. 6 pp. 3348-3351 (1999).

Cataldo et al., Fullerene Science and Technology vol. 8, No. 3, pp. 153-164 (2000).

Cataldo et al., Fullerence Science and Technology, vol. 8, No. 1&2, pp. 105-112 (2000).

Lu et al., Journal of The Society of Materials Science, vol. 50, No. 6, pp. 578-584 (2001).

Girad et al., Physical Review B, vol. 49, No. 16, pp. 11425-11432 (1994).

Smit et al., "The Glass Transititon in Carbon Black Reinforced Rubber" XP009063221, vol. 5, No. 5, pp. 277-283 (1966.

Girifaico, L, "Molecular properties of C60 in the gas and solid phases", J. Phys. Chem., 1992, vol. 96, p. 858-861.

Fukahori et al.; "Stress Analysis of eslastomeric materials at large extensions using the finite element method"; Part II Stress and strain distribution around rigid spherical particles. Journal of Material Science 28, (1993) 4471-4482.

* cited by examiner

BREAKAGE OF BONDING POINT

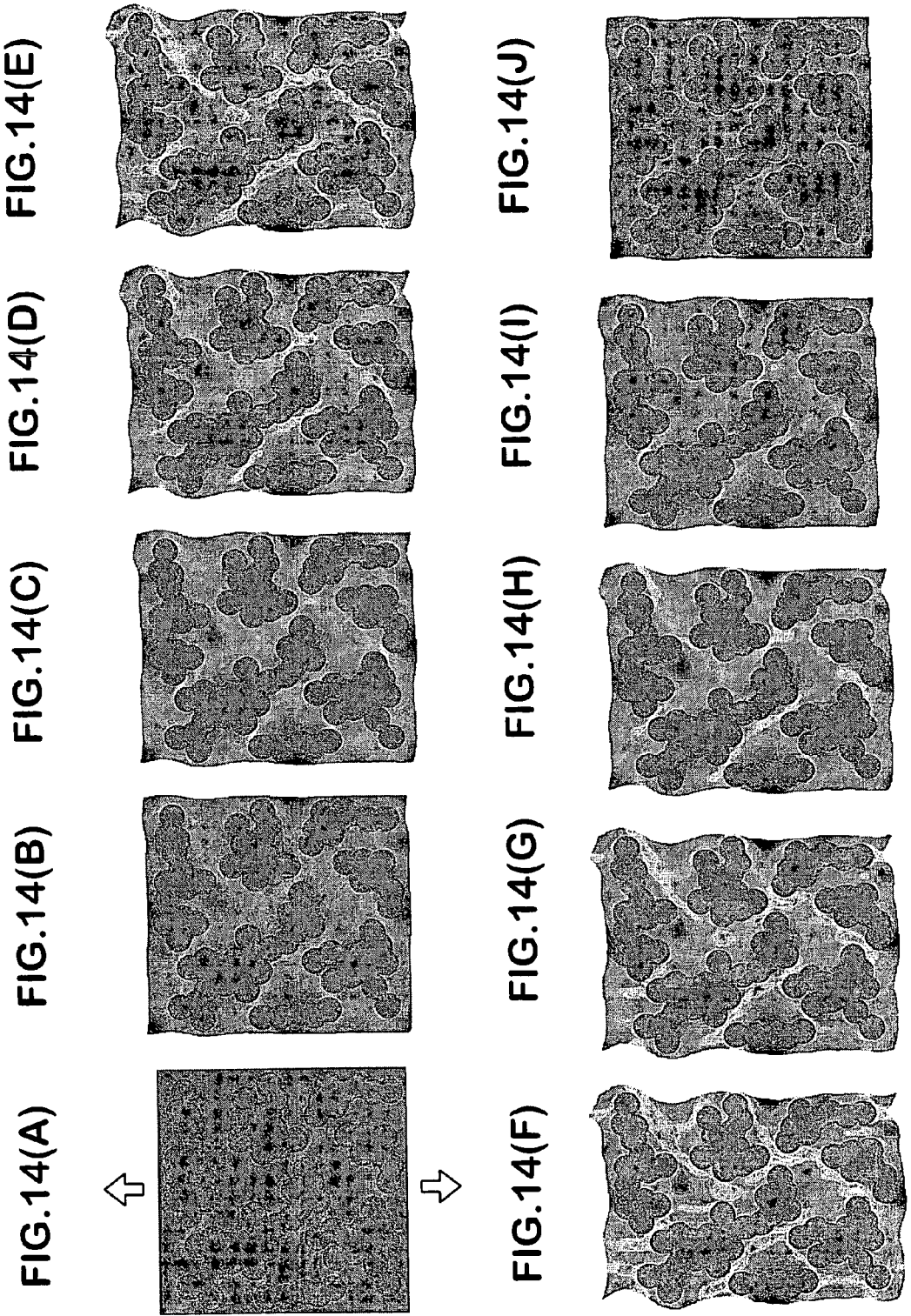

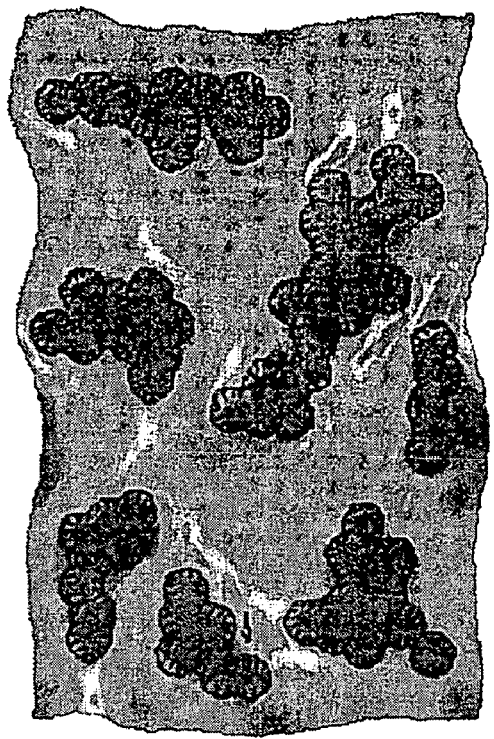
FIG.15(B)
ITNERFACE CONSIDERED
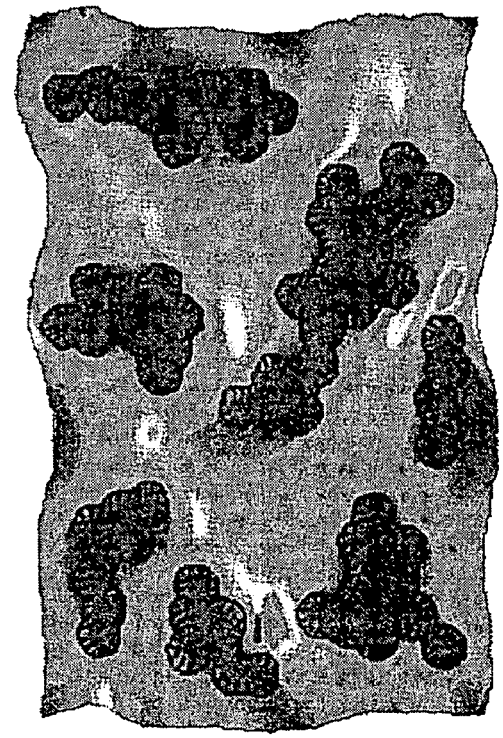
FIG.15(A)
INTERFACE NOT CONSIDERED
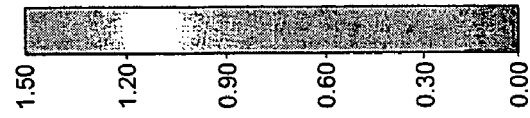

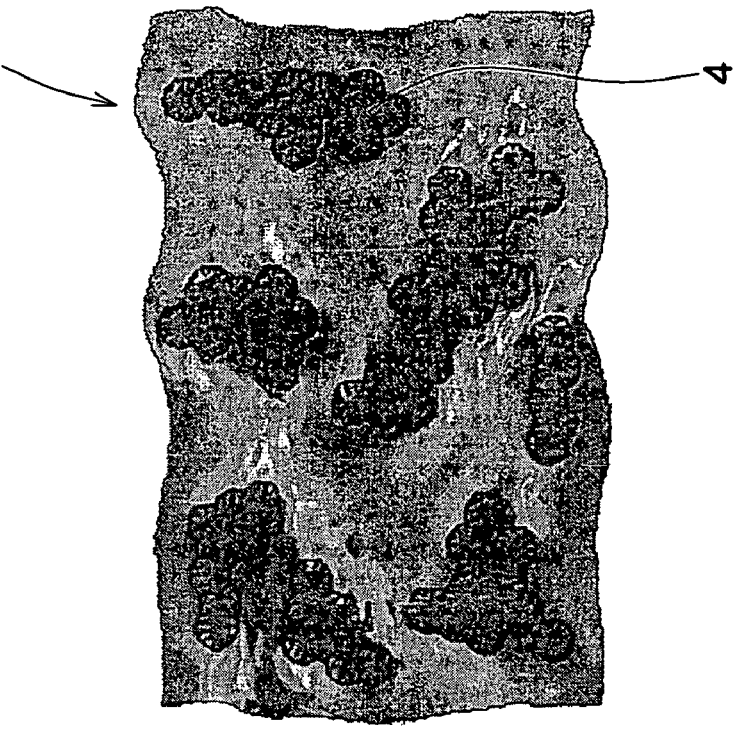
FIG.16(A)
INTERFACE NOT CONSIDERED
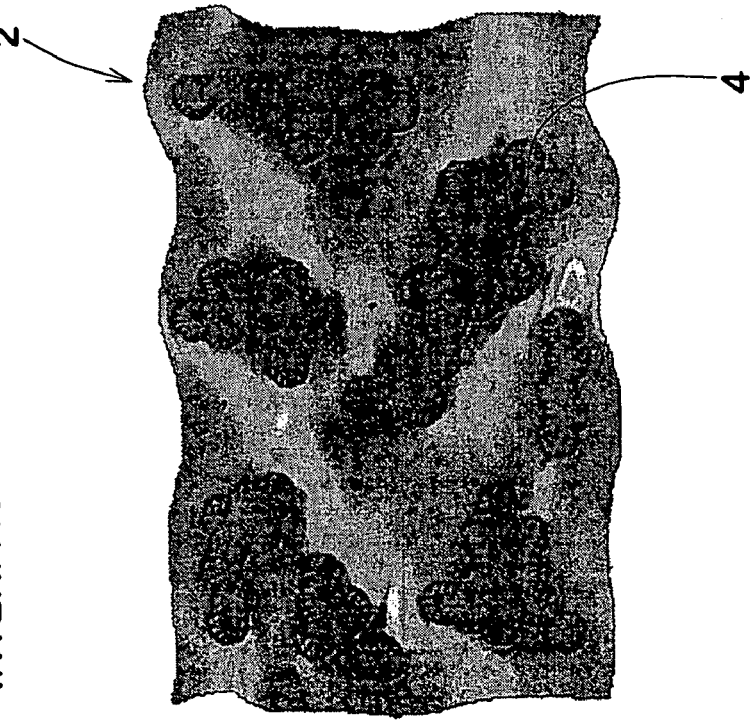
FIG.16(B)
ITNERFACE CONSIDERED
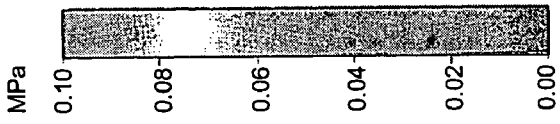

PRIOR ART

METHOD OF SIMULATING VISCOELASTIC MATERIAL

This Non-provisional application claims priority under 35 U.S.C. § 119(a) on Patent Application No(s). 2003-358168; 2003-358167; 2003-386992; and 2004-014699 filed in Japan on Oct. 17, 2003; Oct. 17, 2003; Nov. 17, 2003; and Jan. 22, 2004 respectively the entire contents of which are hereby incorporated by reference.

BACKGROUND OF THE INVENTION

1. Field of the Invention

The present invention relates to a method of simulating useful in analyzing, with good accuracy, deformation and the like of the viscoelastic material.

2. Description of the Related Art

The viscoelastic material as represented by rubber is widely used in for example, tires and industrial goods such as sporting goods. The viscoelastic material deforms greatly when subjected to load, and restores to the original state when the load is completely removed or is unloaded. The viscoelastic material has a non-linear elastic behavior under static load and a rate-dependent or viscoelastic behavior with hysteresis under cyclic loading. To reduce the trouble and the cost of experimental manufacture, a simulation of for example, deformation process of the viscoelastic material is carried out using a computer. A conventional simulation method of the viscoelastic material is disclosed in Japanese Laid-Open Patent Publication No. 2002-365205.

The above mentioned publication focuses on the fact that the viscoelastic material shows a different modulus of longitudinal elasticity in accordance with strain velocity. More specifically, strain, strain velocity and stress produced in the relevant viscoelastic material are measured under a measuring condition assuming, in advance, the actual usage state of the viscoelastic material. Thus, the corresponding relationship between the modulus of longitudinal elasticity and the strain velocity is obtained. With respect to a viscoelastic material model serving as an analyzing object, a predetermined strain velocity is given and the modulus of longitudinal elasticity is appropriately calculated from the above corresponding relationship to perform the deformation calculation.

The simulation method of the viscoelastic material is described in for example, the following article.

"A THREE-DIMENSIONAL CONSTITUTIVE MODEL FOR THE LARGE STRETCH BEHAVIOR OF RUBBER ELASTIC MATERIALS" by Ellen M. Arruda and Marry C. Boyce, Journal of the Mechanics and Physics of Solids Volume 41, Issue 2, Pages 389-412 (February 1993).

The content thereof will now be briefly described.

The above mentioned article is premised on the molecular chain network model theory in which the viscoelastic material has a network structure as a microscopic structure. As shown in FIG. 35, the network structure of the viscoelastic material "a" includes a plurality of molecular chains c linked at a linking point b. The linking point b includes a chemical linking point between the molecules such as for example, a chemical cross-linking point.

One molecular chain c is configured by a plurality of segments e. One segment e is the smallest constitutional unit for repetition. Further, one segment e is configured by joining a plurality of monomers f in which carbon atoms are linked by covalent bonding. Carbon atoms each freely rotates with respect to each other around a bond axis between the carbons. Thus, the segment e can be bent, as a whole, into various shapes.

In the above mentioned article, with respect to the fluctuation cycle of the atom, the average position of the linking point b does not change in the long term. Therefore, the perturbation about the linking point b is ignored. Further, the end-to-end vector of the molecular chain c having two linking points b, b on both ends is assumed to deform with a continuous body of the viscoelastic material "a" to which the molecular chain is embedded.

Aruuda et al. also proposes an eight chain rubber elasticity model. As shown in FIG. 6, this model is defined the macroscopic structure of the viscoelastic material as a cubic network structure body h in which the microscopic eight chain rubber elasticity models g are collected. In one eight chain rubber elasticity model g, the molecular chain c extends from one linking point b1 placed at the center of the cube to each of the eight linking point b2 at each apex of the cube, as shown enlarged on the right side of FIG. 6.

In simulation, the viscoelastic material is defined as a super-elastic body in which volume change barely occurs and in which restoration to the original shape occurs after the load is removed. The super-elastic body is, as expressed in the following equation (1), defined as a substance having a strain energy function W that is differentiated by a component Eij of Green strain to produce a conjugate Kirchhoff stress Sij. In other words, the strain energy function shows the presence of potential energy stored when the viscoelastic material deforms. Therefore, the relationship between the stress and the strain of the super-elastic body is obtained from a differential slope of the strain energy function W.

$$S_{ij} = \frac{\partial W}{\partial E_{ij}} \tag{1}$$

Aruuda et al. recognized, based on the non-Gaussian statistics theory, that as the deformation of the viscoelastic material increases, the entropy change increases dramatically (the molecular chain is stretched and oriented), and thus showed the strain energy function W of a rubber elastic body expressed in equation (2). Moreover, by substituting the strain energy function W to the above mentioned equation (1), the relationship between the stress and the strain of the viscoelastic material is obtained.

$$W = C^R N \left( \sqrt{\frac{I_1}{3N}} \cdot \beta + \ln \frac{\beta}{\sinh \beta} \right) - T \cdot n \cdot c \tag{2}$$

$$C^R = n \cdot k_B \cdot T$$

(n: number of molecular chains per unit volume; $k_B$: Boltzmann constant; T: absolute temperature)

$I_1$: primary invariable quantity of strain, $I_1 = \lambda_1^2 + \lambda_2^2 + \lambda_3^2$ ($\lambda_1$, $\lambda_2$, $\lambda_3$ are elongation ratios)

N: average segment number per one molecular chain $$\beta = L^{-1} \left( \frac{r_{chain}}{N \cdot a} \right)$$

($r_{chain}$: distance between the ends of one molecular chain, $$\sqrt{\frac{N \cdot I_1}{3}} \cdot a; a:$$

length of one segment; L: Langevin function, $$L(x) = \coth x - \frac{1}{x})$$

By performing the uniaxial tensile deformation simulation of the viscoelastic material using the relationship between the stress and the strain defined by Aruuda et al., a non-linear relationship between the stress and the strain is obtained, as shown in for example, FIG. 36. This result shows a good correlation with the actual measurement during the loaded deformation.

In the viscoelastic material used as industrial goods, filler (filling agent) such as carbon black and silica is usually blended. To perform the deformation simulation of the viscoelastic material blended with filler with good accuracy, it is not appropriate to ignore the existence of the filler. However, in the conventional simulation, such filler is not taken into consideration.

As a result of a various experiments, various specific phenomenon such as slippage and friction of the matrix and the filler occurs at the interface of the filler and the matrix, and a relatively large energy loss occurs at such region. Therefore, to carry out the simulation of the viscoelastic material with a good accuracy, it is important to take such phenomenon at the interface into consideration in the calculation.

SUMMARY OF THE INVENTION

In view of the above mentioned disadvantages, the present invention aims to propose a method of simulating the viscoelastic material useful in simulating, with good accuracy, the deforming state of modeling of the viscoelastic material on the basis of including a step of dividing the viscoelastic material into a finite number of elements, and a step of dividing at least one filler into a finite number of elements to form a filler model.

The present invention proposes a method of simulating the deformation of a viscoelastic material in which filler is blended to a matrix made of rubber or resin, the method including the steps of dividing the viscoelastic material into a finite number of elements to form a viscoelastic material model, a step of performing deformation calculation of the viscoelastic material model based on a predetermined condition, and a step of acquiring a necessary physical amount from the deformation calculation, where the step of dividing the viscoelastic material into a finite number of elements includes a step of dividing at least one filler into a finite number of elements to form a filler model, and a step of dividing the matrix into a finite number of elements to form a matrix model.

The present invention includes a step of dividing the filler to form a filler model. Therefore, the effect of the filler can be taken into consideration to the result of the deformation calculation of the viscoelastic material model.

The step of dividing the viscoelastic material into a finite number of elements further desirably includes a step of arranging an interface model having a viscoelastic property different from the matrix model between the matrix model and the filler model. The interface model may have a viscoelastic property softer than the matrix model, a viscoelastic property harder than the matrix model, and a viscoelastic property in which a hysteresis loss is greater than the matrix model. In the matrix model, a relationship between the stress and the strain is desirably defined to simulate the energy loss of the matrix rubber.

The filler model desirably includes at least two filler models of a first filler model and a second filler model arranged at a distance from each other. The inter-filler model having an inter-filler attractive force that changes with the distance is arranged between the first filler model and the second filler model. This is useful in taking the interaction between fillers into consideration in the deformation calculation of the viscoelastic material model.

The inter-filler attractive force is desirably set based on a function for a parabolic curve including a gradually increasing region that smoothly increases and reaches a peak with an increase in the distance between the first filler model and the second filler model, and a gradually decreasing region that smoothly decreases and reaches zero at a predetermined characteristic length with a further increase in the distance. Further, a step of linearly decreasing the inter-filler attractive force from a value of start of unloading to zero in the unloaded deformation from the gradually decreasing region is included to take the hysteresis loss produced between the first filler model and the second filler model into consideration in the simulation.

BRIEF DESCRIPTION OF THE DRAWINGS

The invention, together with objects and advantages thereof, may best be understood by reference to the following description of the presently preferred embodiments together with the accompanying drawings in which:

FIGS. 14(A) to 14(J) are diagrams visually showing deformation process of the viscoelastic material model;

FIG. 15(A) is a distribution diagram of tensile strain of a model not taking interface layer into consideration;

FIG. 15(B) is a distribution diagram of tensile strain of a model taking interface layer into consideration;

FIG. 16(A) is a distribution diagram of energy loss of a model not taking interface layer into consideration;

FIG. 16(B) is a distribution diagram of energy loss of a model taking interface layer into consideration;

DETAILED DESCRIPTION OF THE PREFERRED EMBODIMENTS

Figure 1:
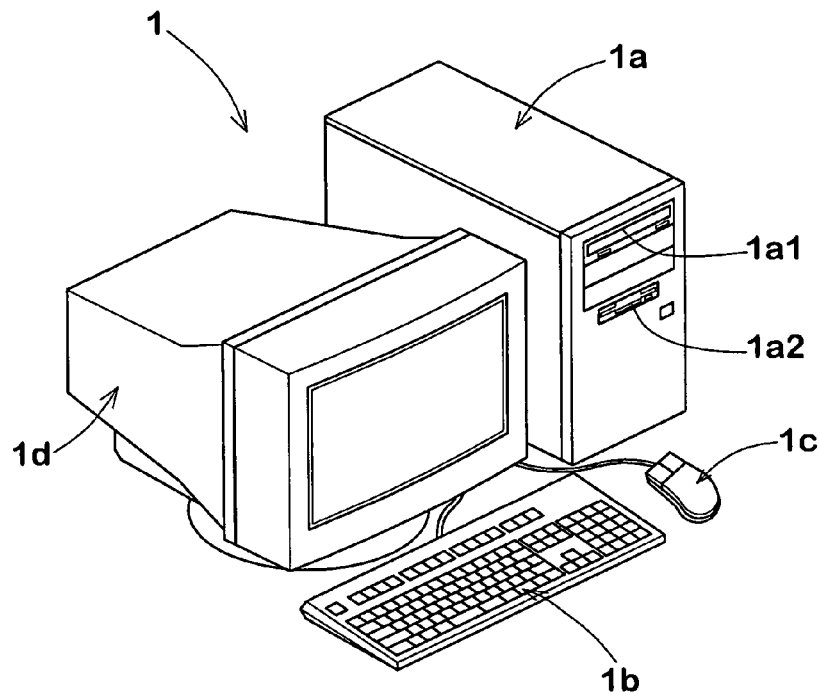
FIG. 1 is a perspective view showing one example of a computer apparatus used in the present invention.

A description will be given below of preferred embodiments according to the present invention with reference to the attached drawings. FIG. 1 shows a computer apparatus 1 for carrying out a simulation method according to the present invention. The computer apparatus 1 includes a main unit 1a, a keyboard 1b, and a mouse 1c serving as input means, and a display 1d serving as output means. Although not shown, the main unit 1a is appropriately provided with a central processing unit (abbreviated as "a CPU"), a ROM, a working memory, a large-capacity storage device such as a magnetic disk, and drives 1a1 and 1a2 for a CD-ROM or a flexible disk. The large-capacity storage device stores therein processing procedures (i.e., programs) for executing a method, described later. An Engineering Work Station and the like are preferably used as the computer apparatus 1.

Figure 2:
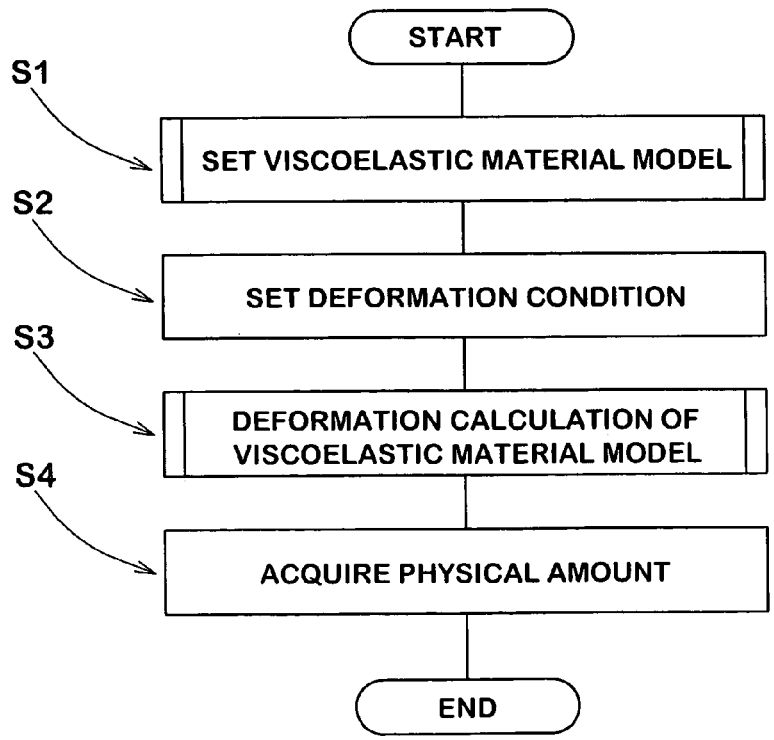
FIG. 2 is a flowchart showing procedures according to a preferred embodiment of the present invention.
Figure 3:
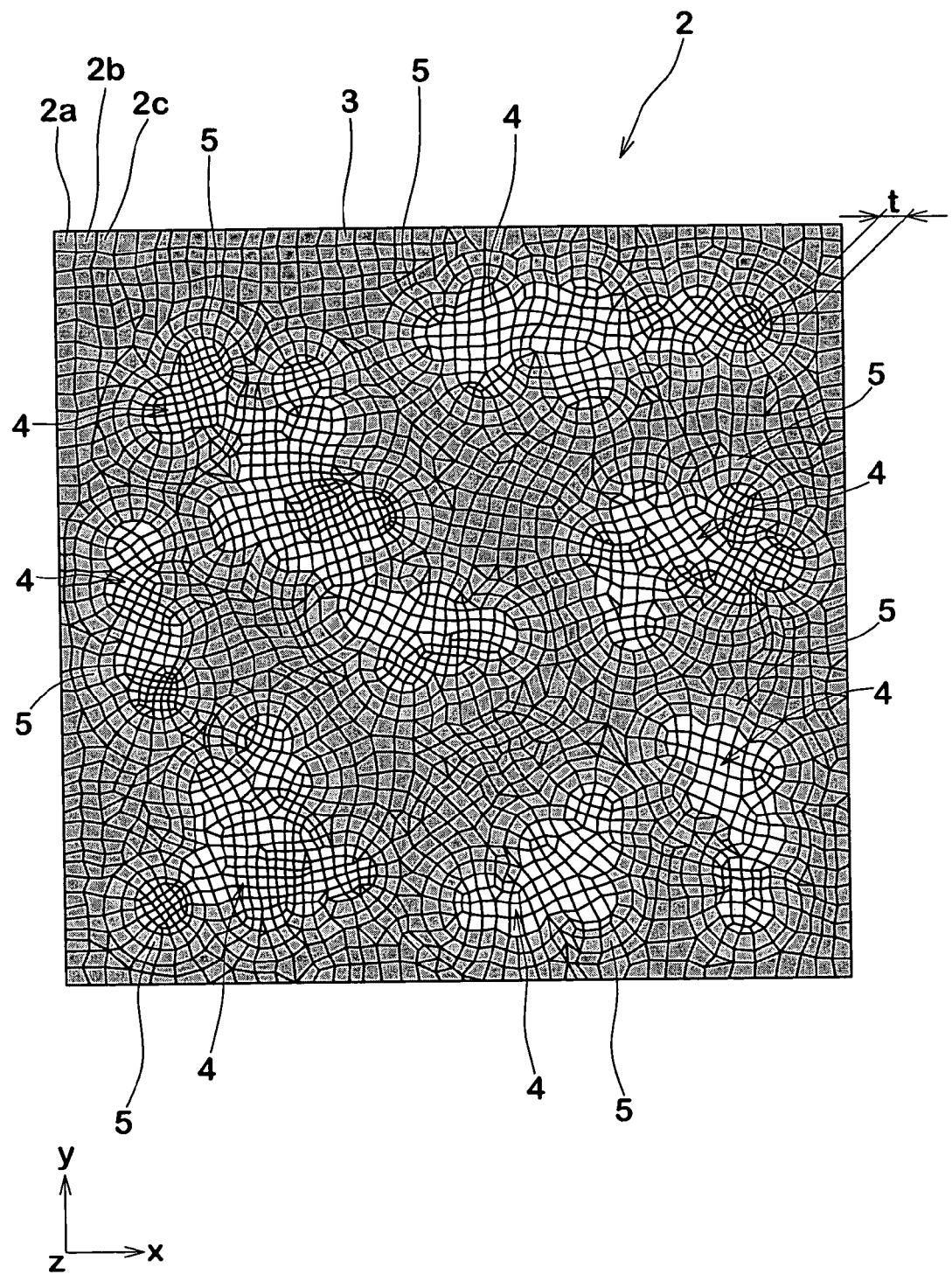
FIG. 3 is a diagram showing one preferred embodiment of a viscoelastic material model (microscopic structure)

FIG. 2 shows one example of a processing procedure of the simulation method according to the present invention. In the present embodiment, a viscoelastic material model is first set (step S1). In FIG. 3, one example of the viscoelastic material model 2 serving as a microscopic structure is visually shown.

To form the viscoelastic material model 2, a microscopic region of the viscoelastic material (no object on whether existent or not) to be analyzed is divided into a finite number of small elements 2a, 2b, 2c . . . . A parameter necessary for deformation calculation using a numerical analysis method is given to each element 2a, 2b, 2c . . . . The numerical analysis method includes for example, finite element method, finite volume method, calculus of finite differences, or boundary element method. The parameter includes for example, node coordinate value, element shape, and/or material property of each element 2a, 2b, 2c . . . . Further, a triangular or a quadrilateral element serving as for example, a two-dimensional plane and a tetrahedral or a hexagonal element serving as a three-dimensional element is used for each element 2a, 2b, 2c . . . . Thus, the viscoelastic material model 2 is numerical data utilizable in the computer apparatus 1. In this example, the two-dimensional viscoelastic material model is shown.

Figure 4:
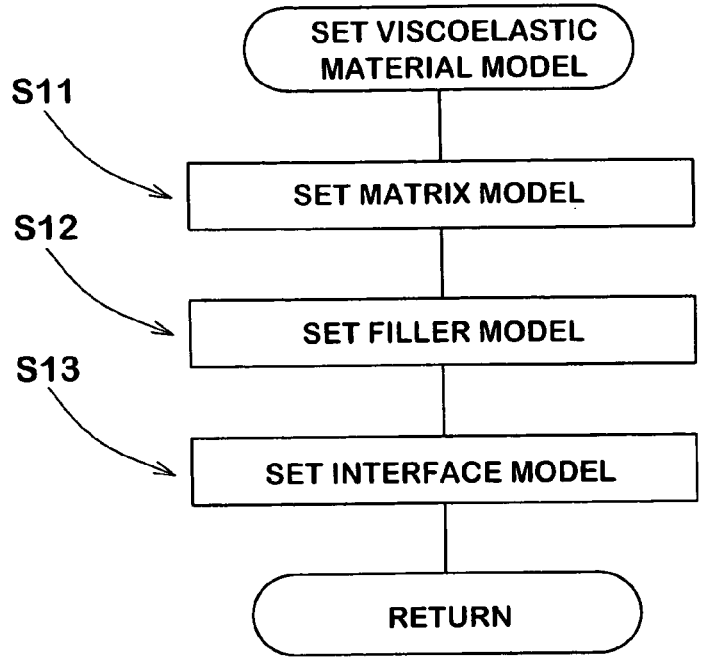
FIG. 4 is a flow chart showing steps for forming the viscoelastic material model (microscopic structure)

FIG. 4 shows, in detail, steps for setting the viscoelastic material model 2. In the present embodiment, the viscoelastic material model 2 is set by a step S11 of dividing a matrix into a finite number of elements and forming a matrix model 3, a step S12 of dividing at least one filler into a finite number of elements and forming a filler model 4, and a step S13 of forming an interface model 5 having a viscoelastic property different from the matrix model 3.

The viscoelastic material model 2 shown is thus configured with the matrix model 3 in which the matrix made of rubber or resin is modeled, the filler model 4 (white part), distributed and blended in the matrix model 3, and in which the filler is modeled, and the interface model 5 (darkish part) interposed between the matrix model 3 and the filler model 4 to form interfaces between the models.

In the figure, the matrix model 3 is the darkest part. The matrix model 3 constitutes a main part of the viscoelastic material model 2 and is divided into triangular or quadrilateral elements in this example. A relationship between the stress and the strain expressed in for example, the following equation (3) for the material property is given to each element of the matrix model 3.

$$\overset{\triangledown}{S}_{ij} = -\dot{p}\delta_{ij} + R_{ijkl}\dot{\varepsilon}_{kl} \tag{3}$$

where $$R_{ijkl} = \frac{1}{3}C^R\sqrt{N}\left\{\left(\frac{\xi_c}{\sqrt{N}} - \frac{\beta_c}{\lambda_c}\right)\frac{B_{ij}B_{kl}}{B_{mm}} + \frac{\beta_c}{\lambda_c}(\delta_{ik}B_{jl} + B_{ik}\delta_{jl})\right\}$$

$$C^R = n \cdot k_B \cdot T$$

(n: number of molecular chains per unit volume; $k_B$: Boltzmann constant; T: absolute temperature)

N: average segment number per one molecular chain $$\xi_c = \frac{\beta_c^2}{1 - \beta_c^2 \csc h^2 \beta_c} \qquad \dot{p} = -K\dot{\varepsilon}_{mm} \qquad K = \psi \max(R_{ijkl})$$

$$\beta_c = L^{-1}\left(\frac{\lambda_c}{\sqrt{N}}\right) \qquad \lambda_c^2 = \frac{1}{3}(\lambda_1^2 + \lambda_2^2 + \lambda_3^2)$$

$\lambda_1^2 + \lambda_2^2 + \lambda_3^2 = I_1$, $I_1$: primary invariable quantity of strain $B_{ij}$: left Cauchy-Green deformation tensor A derivation process of equation (3) will now be briefly explained. The viscoelastic material such as rubber has very small volume change during deformation, and can be ignored in the calculation. Thus, the calculation can be performed having a density of the viscoelastic material as a constant. Therefore, the Kirchhoff stress $S_{ij}$ can be expressed as equation (4). In equation (4), $E_{ij}$ is a component of Green strain, p is a hydrostatic pressure, Xi is a position of an arbitrary object point P in a state C0 where stress and strain are 0, and $x_j$ is a position of the object point P in a deformed state C.

$$S_{ij} = \frac{\partial W}{\partial E_{ij}} - p\left(\frac{\partial X_i}{\partial x_m}\right)\left(\frac{\partial X_j}{\partial x_m}\right) \qquad (4)$$

A relationship expressed in the following equation (5) exists between the component $\sigma_{ij}$ of Cauchy stress and the component $S_{mn}$ of Kirchhoff stress. Therefore, equation (6) can be obtained from equation (4).

$$\sigma_{ij} = \frac{1}{J}\frac{\partial x_i}{\partial X_m} S_{mn} \frac{\partial x_j}{\partial X_n} \qquad (5)$$

$$\sigma_{ij} = \frac{\partial W}{\partial E_{mn}} \frac{\partial x_i}{\partial X_m} \frac{\partial x_j}{\partial X_n} - p\delta_{ij} \qquad (6)$$

In equation (5), if the volume is constant, "J" showing the rate of volume change of the object is assumed to be "1". Further, the strain energy function of equation (2) is a function of only the primary invariant quantity $I_1$ of the strain of the left Cauchy-Green deformation tensor $A_{ij}$. Therefore, equation (7) is further obtained from equation (6).

$$\sigma_{ij} = 2\frac{\partial W}{\partial I_1} A_{ij} - p\delta_{ij} \qquad (7)$$

Further, by using the following relational expressions (8), (9), and (10), the velocity form display of equation (7) is expressed as equation (11).

$$\overset{\triangledown}{\sigma} = \dot{\sigma} - W\sigma + \sigma W \qquad (8)$$

$$\dot{I}_1 = (trA)^{\cdot} = 2A \cdot D \qquad (9)$$

$$\dot{A} = (D + W)A + A(D - W) \qquad (10)$$

$$\overset{\triangledown}{\sigma}_{ij} = -\dot{p}\delta_{ij} + \frac{1}{3}C^R\sqrt{N} \qquad (11)$$

$$\left\{\left(\frac{\xi_c}{\sqrt{N}} - \frac{\beta_c}{\lambda_c}\right)\frac{B_{ij}B_{kl}}{B_{mm}} + \frac{\beta_c}{\lambda_c}(\delta_{ik}B_{jl} + B_{ik}\delta_{jl})\right\}$$

Under a condition of constant volume, the Jaumann velocity of Cauchy stress shown in equation (11) can be replaced by the Jaumann velocity of Kirchhoff stress. Further, by replacing the deformation velocity tensor D with the strain velocity tensor, the constitutive equation of the velocity form display of a non-compressible viscoelastic material is obtained as equation (3).

Figure 36:
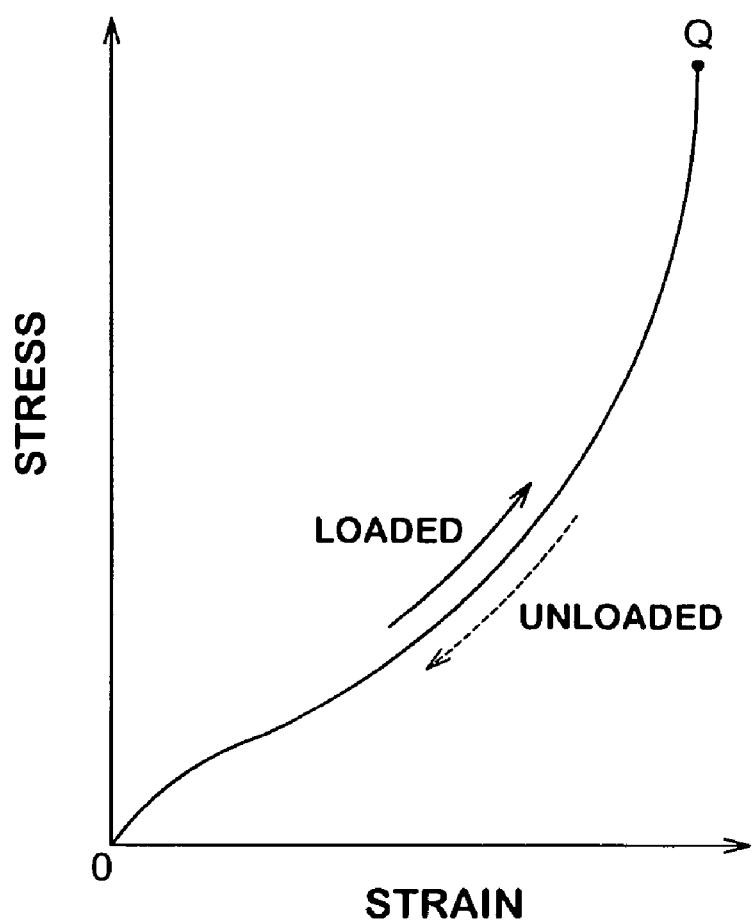
FIG. 36 is a view showing stress-strain curve as a conventional simulation result.

However, if only equation (3) is used, similar to the article of Aruuda et al., the energy loss, one of the characteristic of the viscoelastic material, can not be taken into consideration in the simulation. That is, when simulation for removing the load from point Q of FIG. 36 is performed, the strain is restored through substantially the same path as the curve for when subjected to load. Thus, there is a disadvantage that a hysteresis loop does not appear.

The inventor et al. attempted various improvements on the premise of the model of Aruuda et al. As state above, the viscoelastic material tolerates great strain reaching to several hundred % by stretching a long molecular chain c intricately intertwined with each other. The inventor et al. hypothesized that a portion intertwined with respect to each other of the molecular chain c of the viscoelastic material may come loose and disappear (reduction in the number of linking point b), or that by removing the load, intertwining may again be produced (increase in the number of linking point b) during the loaded deformation process.

Figure 5:
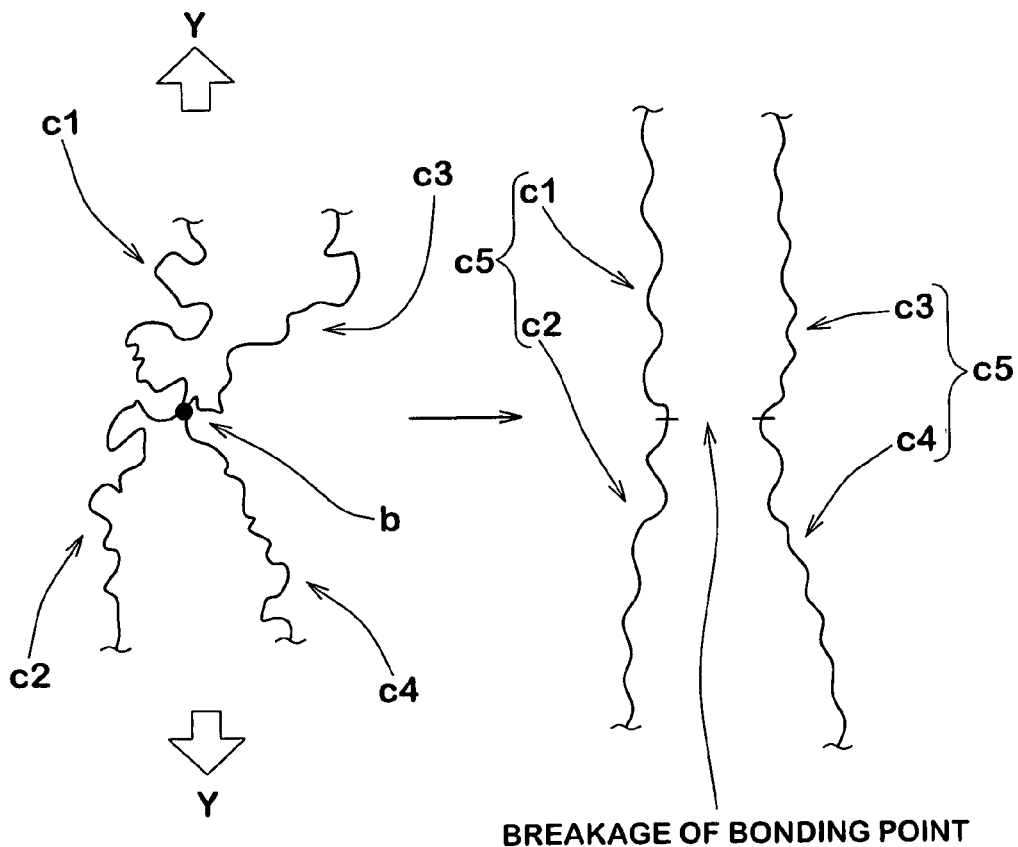
FIG. 5 is a diagram explaining the break of a linking point of a molecular chain.

As shown in FIG. 5, when tensile stress Y is loaded to the molecular chain c1, c2, c3 and c4 linked at one linking point b, each molecular chain c1 to c4 stretches and the linking point b is subjected to great strain and tends to break (disappear). As shown on the right side of FIG. 5, the two molecular chains c1 and c2 act as one long molecular chain c5. The molecular chains c3 and c4 also act in the same way. Such phenomenon sequentially occurs as the loaded deformation of the rubber material proceeds and large amount of energy loss tends to occur.

To simulate the energy loss of the matrix rubber, above phenomenon is preferably applied to the equation (2). To this end, an average segment number N per one molecular chain c is defined as a variable parameter that differs between the loaded deformation and the unloaded deformation. Here, the loaded deformation refers to increase in strain of the matrix model 3 during a minimal time, and the unloaded deformation refers to decrease in strain.

Figure 6:
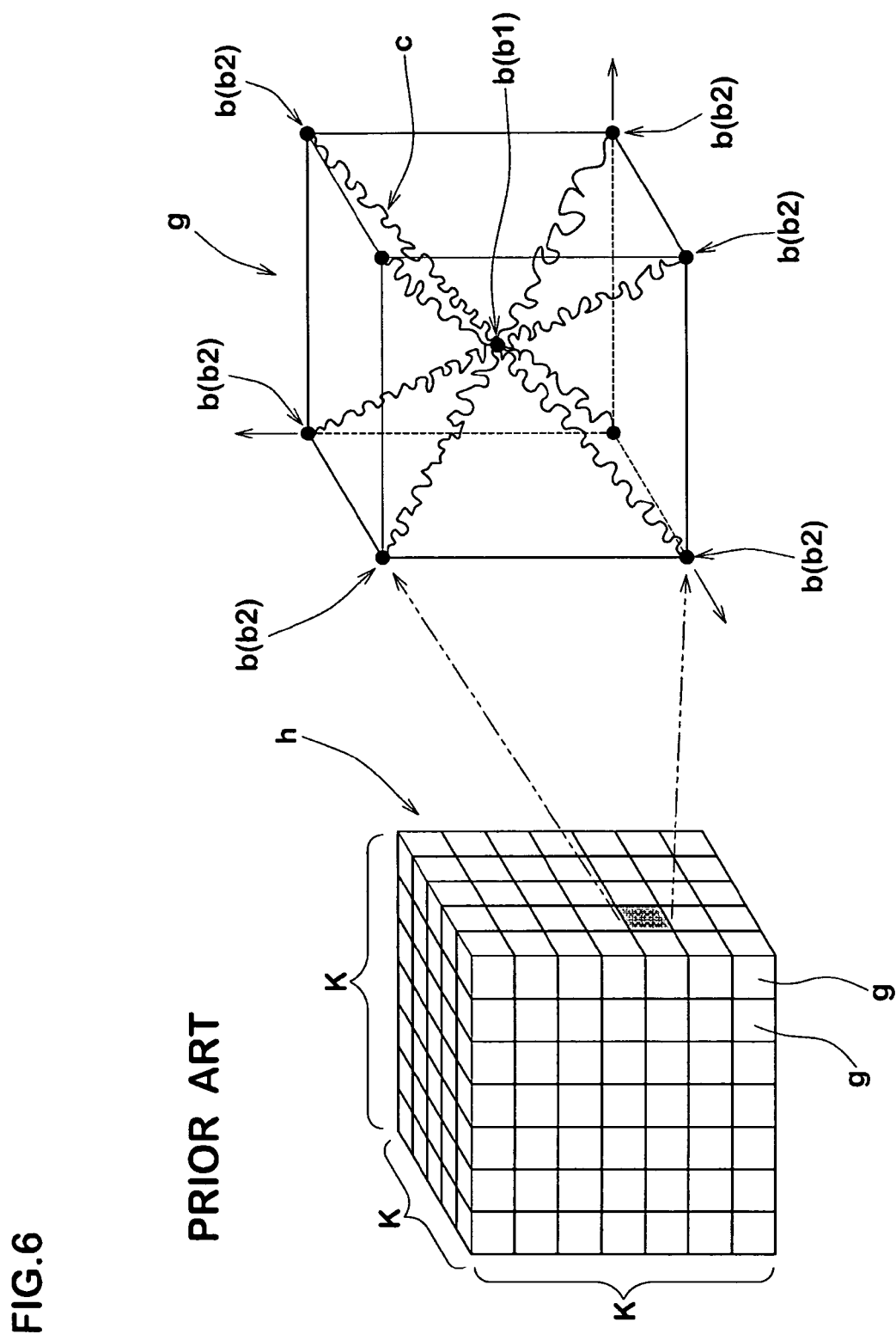
FIG. 6 is a perspective view showing one example of a network structure of the viscoelastic material and an eight chain rubber elasticity model thereof.

The macroscopic three-dimensional network structure body h of FIG. 6 is again referred to in view of the above points. The network structure body h is a body in which k number of eight chain rubber elasticity model are each bonded in the directions of the axis, the height, and the depth. It is to be noted that k is a sufficiently big number. The total number of linking point b included in the relevant network structure body h is referred to as "binding number". Assuming that the binding number is "m" and the number of molecular chains c in the network structure h (i.e., the number of molecular chains per unit volume of the matrix model 3) is "n", m and n are respectively expressed as:

$$m = (k+1)^3 + k^3 \qquad (12)$$

$$n = 8k^3 \qquad (13)$$

Since "k" is a sufficiently big number, when the terms other than the third power of k are omitted, the above equations may be expressed as the following equations (14) and (15), respectively:

$$m = 2k^3 \qquad (14)$$

$$n = 8k^3 \qquad (15)$$

From the relationship of equations (14) and (15), the binding number m may be expressed by n, as equation (16).

$$m = n/4 \quad (16)$$

Further, since the total number $N_A$ of segments of the molecular chain included in the matrix model 3 does not change even if the matrix model 3 is deformed, equations (17) and (18) are realized.

$$N_A = n \cdot N \quad (17)$$

$$N = N_A/n = N_A/4m \quad (18)$$

As apparent from the equation (18), in the loaded deformation and the unloaded deformation (restoring process of strain) following thereto, the binding number m of the molecular chain of the rubber needs to be changed to have the average segment number N as the variable parameter. In this way, by having the average segment number N as a variable parameter having different values for the loaded deformation and the unloaded deformation, the energy loss of the matrix model 3 can be simulated.

The average segment number N is determined by various methods. For instance, the average segment number N can be increased based on the parameter related to strain during the loaded deformation. The parameter related to strain is not particularly limited and may be for example, strain, strain velocity, or primary invariable quantity $I_1$ of strain. In the present embodiment, the average segment number N is defined by the following equation (19). This equation shows that the average segment number N is a function of the primary invariable quantity $I_1$ (more specifically, a parameter $\lambda_c$ square root thereof) of strain in each element of the relevant matrix model 3.

$$N(\lambda c) = A + B \bullet \lambda c + C \bullet \lambda c^2 + D \bullet \lambda c^3 + E \bullet \lambda c^4 \quad (19)$$

$$\text{Where } \lambda_c = \sqrt{\frac{I_1}{3}}$$

Equation (19) is one example established by a variety of experiments, and the constants A to E may be easily set based on for example, an uniaxial tension test result of the viscoelastic material. For instance, the stress-strain curve is first obtained for the viscoelastic material or the object to be analyzed. Subsequently, n and N are set so as to be along the curve of when load is unloaded. The total number $N_A$ (=n·N) of segment of the molecular chain is thus determined. Here, since the total segment number $N_A$ of the molecular chain c is the same during the loaded deformation and during the unloaded deformation, the average segment number N in each strain is derived so as to comply with the curve during when load is loaded. The parameters A to E of equation (19) are determined so as to comply with the determined average segment number N during loading. In the present embodiment, N=6.6 is used, and the above constants are set as:

$$A = +2.9493$$

$$B = -5.8029$$

$$C = +5.5220$$

$$D = -1.3582$$

$$E = +0.1325$$

Figure 7:
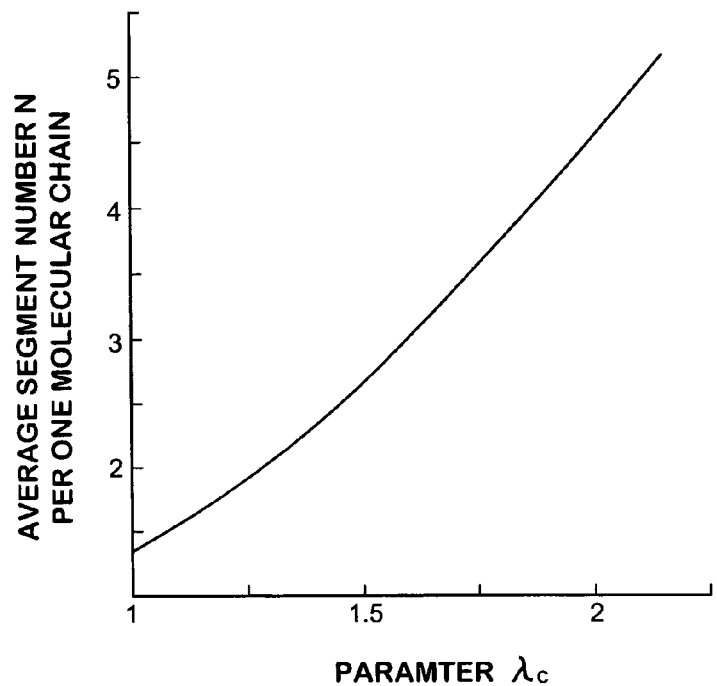
FIG. 7 is a graph showing a relationship of a parameter $\lambda c$ and an average segment number N per one molecular chain.

In FIG. 7, a relationship between the average segment number N and the parameter $\lambda_c$ during loaded deformation of each element of the matrix model 3 is shown. When $\lambda_c$, a parameter relating to strain, is increased, the average segment number N is also gradually increased. In this example, the upper limit of parameter $\lambda_c$ is 2.5. In the deformation simulation of the viscoelastic material model 2 described hereinafter, during the loaded deformation, the parameter $\lambda_c$ of each element of the matrix model 3 is calculated on a steady basis. The calculated $\lambda_c$ is substituted to equation (19), and the average segment number N during the relevant strain state of the relevant element is calculated. Here, the value of the average segment number N during the unloaded deformation of the matrix model 3 is constant.

Figure 8:
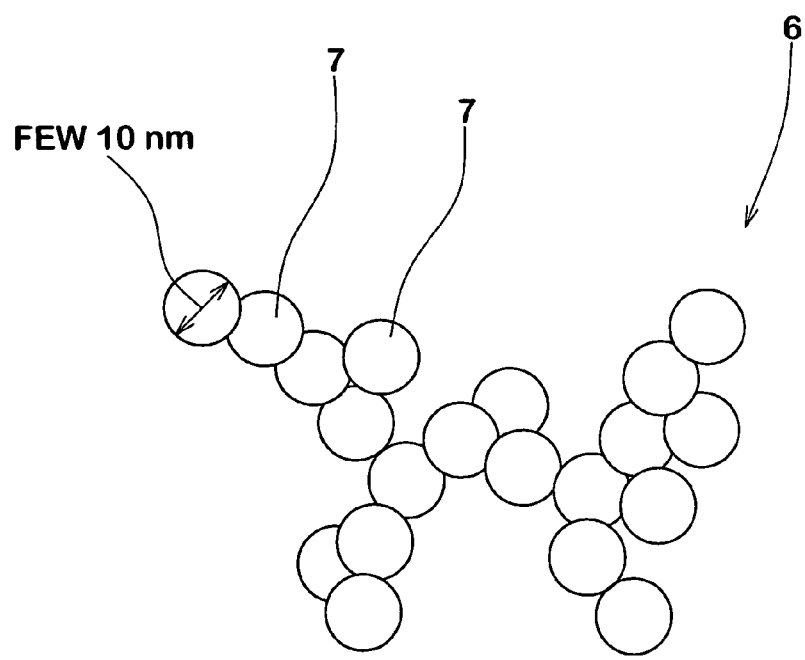
FIG. 8 is a diagram showing a shape of a carbon black.

In the present embodiment, the filler model 4 in which a carbon black is modeled is shown. It is to be noted that the filler is not limited to carbon black and may be for example, silica and the like. In the present example, the physical shape of the filler model 4 is set based on the shape of the carbon black filled in the actual rubber imaged with an electronic microscope. FIG. 8 shows a secondary particle of the carbon black 6. The secondary particle has, more specifically, a structure in which a plurality of spherical primary particles 7 each consisting of carbon atom having a diameter of approximately 10 nm is irregularly bonded three-dimensionally.

The carbon black 6 has hardness (modulus of longitudinal elasticity) several hundred times harder than the matrix rubber. Thus, the filler model 4 is defined as an elastic body instead of a viscoelastic body in the present embodiment. Therefore, the filler model 4 has a modulus of longitudinal elasticity as the material property, and the stress and the strain are proportional in the deformation calculation. The number of filler model 4 is appropriately set based on the filler blending amount of the viscoelastic material of the analyzing object.

The interface model 5 is provided between the matrix model 3 and the filler model 4. The interface model 5 is not necessarily limited to continuously surround the filler model 4, but preferably, surrounds the filler model 4 throughout the entire range. In this example, the interface model 5 has a small thickness. The thickness t of the interface model 5 is for example, between 1 and 20 nm, and more preferably, between 5 to 10 nm.

The physical structure having an interface layer having such physical thickness on the interfaces of the filler and the rubber matrix is not actually recognized. However, various phenomenons for causing energy loss such as slippage and friction are recognized on the interfaces of the filler and the matrix rubber. Thus, to take such phenomenon into consideration in the simulation, the interface model is defined as the viscoelastic material in the calculation in the simulation. Therefore, similar to matrix model 3, the relationship between the stress and the strain expressed in equation (3) is defined for the interface model 5.

It is to be noted that the interface model 5 has a viscoelastic property different from the matrix model 3. The interface model 5 of the present embodiment has a viscoelastic property softer than the matrix model 3. Therefore, when the same stress acts on the interface model 5 and the matrix model 3, the strain of the interface model 5 becomes greater than the strain of the matrix model 3. Further, the interface model 5 has a viscoelastic property in which the hysteresis loss (energy loss produced per 1 cycle of strain) is greater than the matrix model 3. This is carried out by for example, adjusting the parameter of equation (19) for calculating the average segment number N applied to equation (3).

Next, a deformation condition of the viscoelastic material model 2 is set (step S3).

Figure 9:
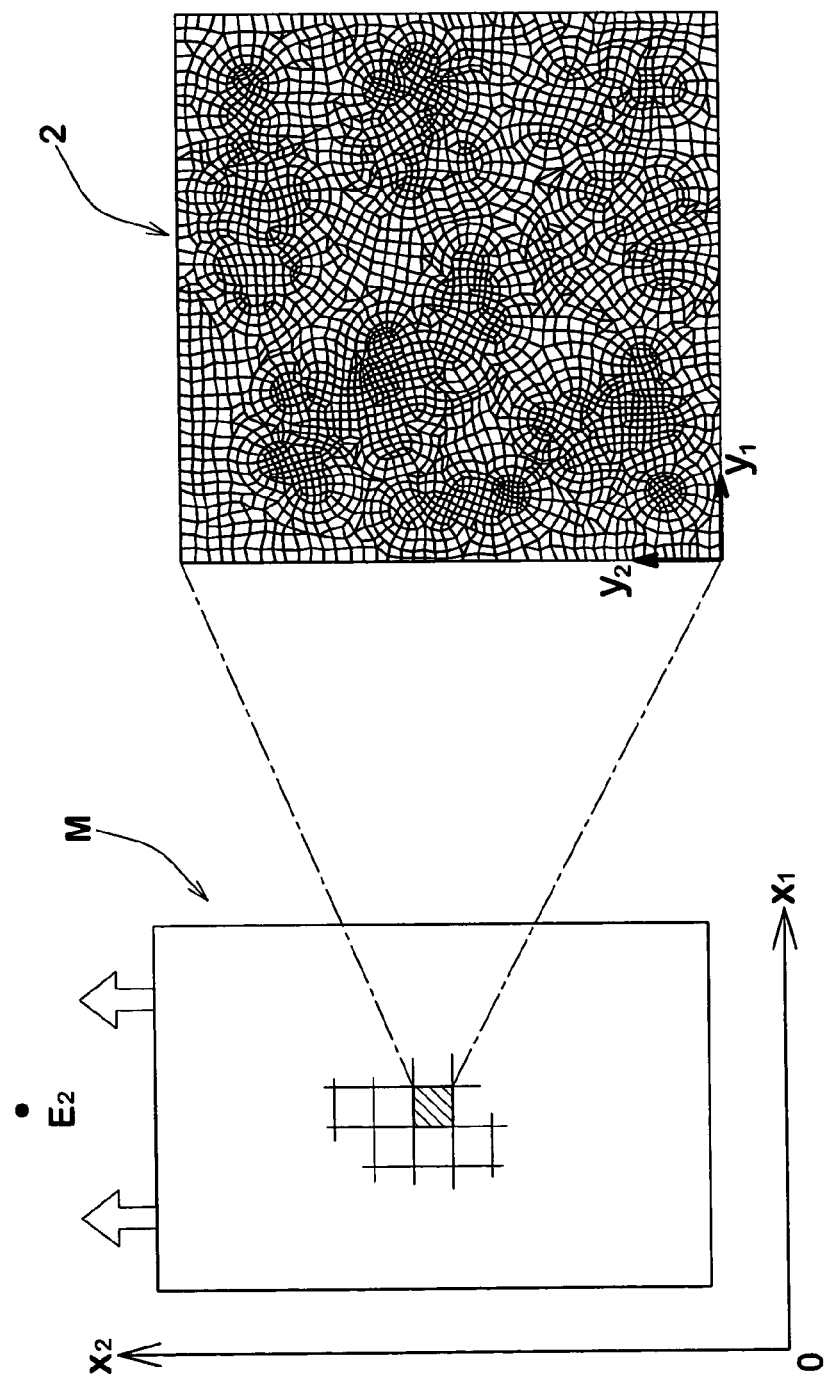
FIG. 9 is a view showing a relationship of the microscopic structure and an entire structure explaining a homogenizing method.

In the present embodiment, the viscoelastic material model 2 is deformed under a condition of uniaxial tension (plane strain state). Therefore, the viscoelastic material model 2 does not have strain in the direction of the Z axis of FIG. 3. The deformation condition includes strain velocity and maximum strain of when the viscoelastic material model 2 deforms. Further, the deformation calculation may be carried out on one microscopic piece of viscoelastic material model 2 shown in FIG. 2, but is preferably carried out, as shown in FIG. 9, using a viscoelastic material entire model M in which the microscopic structure of the viscoelastic material model 2 (viscoelastic material model 2 shown in FIG. 3) is periodically repeated in the vertical and the horizontal direction.

When carrying out deformation calculation of the viscoelastic material entire model M as above, a homogenizing method is desirably used. In the viscoelastic material entire model M, the extent of repetition of the microscopic structure is very close. Thus, it is difficult to divide directly the entire model M using only the finite element method. In the homogenizing method, as shown in FIG. 9, two independent variables of macroscopic scales $x_1$, $x_2$ representing the viscoelastic material entire model M and the microscopic scales $y_1$, $y_2$ representing the above mentioned microscopic structure are used. In the homogenizing method, the respective independent variable in different scales of the microscopic scales $y_1$, $y_2$ and the macroscopic scales $x_1$, $x_2$ are asymptotically developed. Thus, an average dynamic response of the viscoelastic material entire model M of a certain size periodically including a model structure of the microscopic structure shown in FIG. 3 can be obtained.

The asymptotically developing homogenizing method is a method already established in the numerical calculation method. The method is described in detail in for example, the following article.

Higa, Y. and Tomita, Y., Computational Prediction of Mechanical properties of Nickel-based superalloy with gamma Prime Phase Precipitates, Proceedings of ICM8 (Victoria, B. C., Canada), Advance Materials and Modeling of Mechanical Behavior, (Edited by Ellyin, F., and Prove, J. W.), III (1999), 1061-1066, Fleming Printing Ltd.

The length of one side of the viscoelastic material model 2 is 300 nm×300 nm, and the viscoelastic material entire model M shown in FIG. 9 has an oblong shape of 2 mm×2 mm. A constant strain velocity is applied to the microscopic structure of FIG. 3 so as to cause a uniform uniaxial tensile strain $E_2$ (strain velocity thereof is $1.0 \times 10^{-5}$/s). When the strain $E_2$ in the $x_2$ direction of FIG. 9 reaches 0.65, a condition to gradually reduce the strain to zero at the same strain velocity is set.

Figure 10:
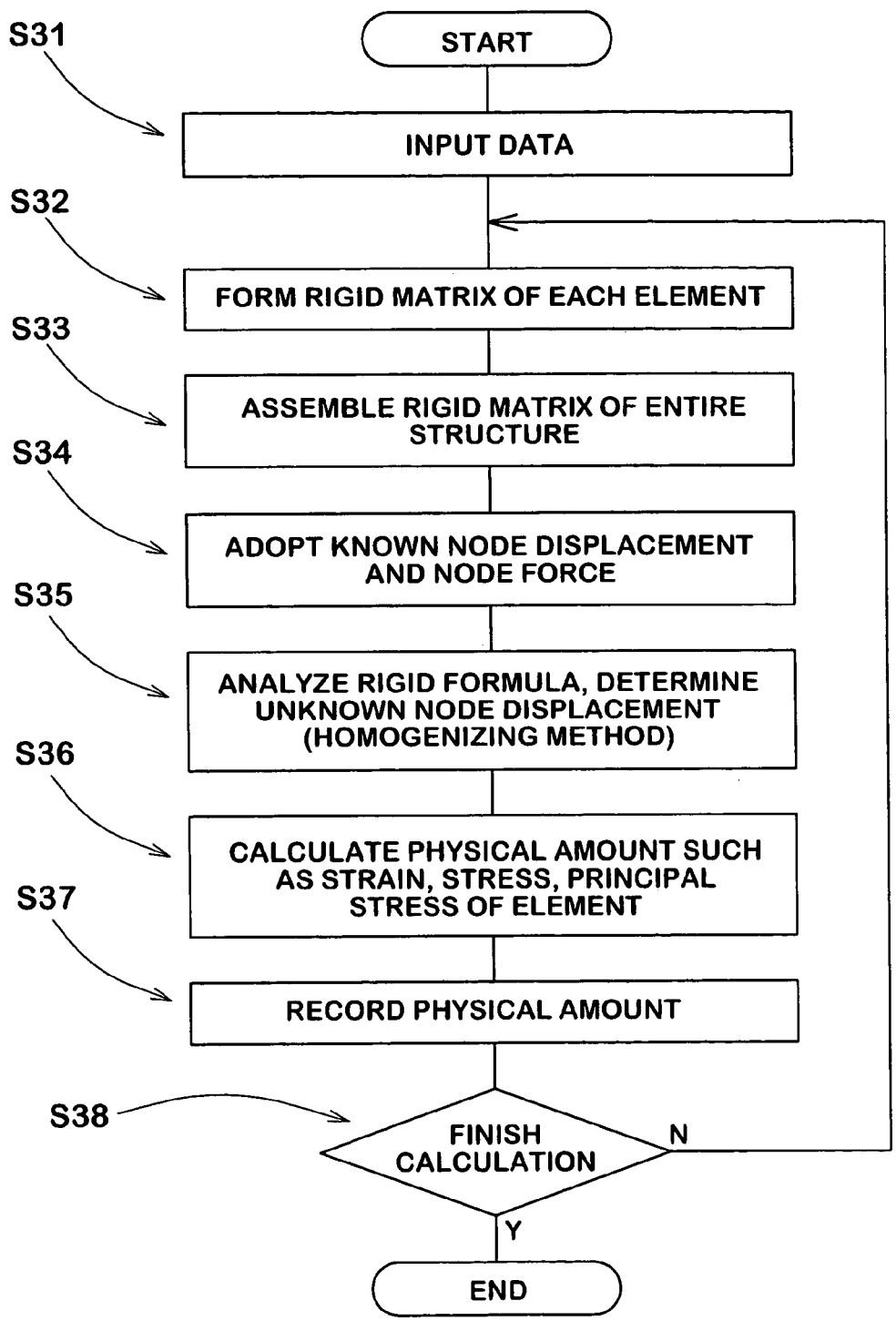
FIG. 10 is a flowchart showing procedures of deformation simulation.

The deformation calculation (simulation) using the set model and condition is performed (step S3). In FIG. 10, one example of a specific procedure of the deformation calculation is shown. In the deformation calculation, data is first input to the computer apparatus 1 (step S31). The input data includes for example, numerical data for configuring the viscoelastic material model 2, and a variety of pre-set boundary conditions.

A rigid matrix of each element is then formed (step S32), and thereafter, the rigid matrix of the entire structure is assembled (step S33). A known node displacement and node force are adopted to the rigid matrix of the entire structure (step S34), and an analysis of the rigidity formula is carried out. The unknown node displacement is determined (step S35) and physical quantity such as strain, stress, and principal stress of each element are calculated and output (step S36, S37). In step S38, a determination is made whether or not to finish the calculation, and if the calculation is not to be finished, steps after step S32 is repeated. Equation (20), for example, is used for the element equation based on the principal of virtual work.

$$\int_V (\dot{S}_{ji} + \sigma_{mj} v_{i,m}) \delta v_{i,j} dV + \int_{S_{int}} \delta \Phi dS = \int_{S_{ext}} \dot{P}_i \delta v_i dS \tag{20}$$

where $S_{ji}$ is Kirchhoff stress velocity, $\sigma_{mj}$ is stress of Cauchy, $v_{i,m}$ is displacement velocity slope, $P_i$ is velocity of surface force, and $\Phi$ is irreversible work per unit surface area.

In the calculation of the homogenizing method, the macroscopic equilibrium equation of the following equation (21) and the property displacement function (Y-periodic) of equation (22) are used.

$$L_{ijkl}^H = \frac{1}{|Y|} \int_Y \left[ L_{ijkl} - L_{ijkl} \frac{1}{2} \left( \frac{\partial \chi_p^{kj}}{\partial y_q} + \frac{\partial \chi_q^{kj}}{\partial y_p} \right) \right] dY \tag{21}$$

$$\tau_{ijkl}^H = \frac{1}{|Y|} \int_Y \left( \sigma_{ij} \delta_{kj} - \sigma_{mj} \frac{\partial \chi_j^{kl}}{\partial y_m} \right) dY$$

$$\int_Y \left[ L_{ijpq} \frac{1}{2} \left( \frac{\partial \chi_p^{kl}}{\partial y_q} + \frac{\partial \chi_q^{kl}}{\partial y_p} \right) + \sigma_{qj} \delta_{pi} \frac{\partial \chi_p^{kl}}{\partial y_q} \right] \frac{\partial \delta v_i}{\partial y_j} dY = \int_Y (L_{ijkl} + \sigma_{ij} \delta_{ki}) \frac{\partial \delta v_i}{\partial \delta y_j} dY \tag{22}$$

$$\chi^{kl} \cdots Y - \text{periodic}$$

$$\int_Y \left[ L_{ijkl} \frac{1}{2} \left( \frac{\partial \phi_k}{\partial y_l} + \frac{\partial \phi_l}{\partial y_k} \right) + \sigma_{mj} \frac{\partial \phi_i}{\partial y_m} \right] \frac{\partial \delta v_i}{\partial y_j} dY = \int_Y P'_{ij} \frac{\partial \delta v_i}{\partial \delta y_j} dY$$

$$\phi \cdots Y - \text{periodic}$$

The deformation calculation may be carried out using an engineering system analyzing application software (e.g., LS-DYNA and the like, developed and improved in Livermore Software Technology Corporation (US)) using the finite element method.

In the present embodiment, the constants and the like of equation (3) are set as the following:

$C_R$=0.268

N=6.6

T=296

$k_B$=1.38066×$10^{-29}$ n=6.558×$10^{25}$

NA=4.328×$10^{26}$

Volume content of filler model: 30%

Modulus of longitudinal elasticity E of filler model: 100 MPa

Poisson's ratio v of filler model: 0.3

In the deformation calculation, the average segment number N is calculated for each strain state, as mentioned above, and such value is substituted to equation (3) and the calculation is sequentially carried out. The three-dimensional eight chain rubber elasticity model of Aruuda et al. is used in the viscoelastic material model 2 and the viscoelastic material entire model M without changing in the direction of thickness (direction of Z axis in FIG. 3). Further, the average segment number N of the matrix model 3 and the interface model 5 is set as the following:

<Matrix Model>
average segment number N during loaded deformation $$N=3.2368+20.6175\lambda c-21.8168\lambda c^2+10.8227\lambda c^3-1.9003\lambda c^4$$

average segment number N (constant) during unloaded deformation $$N=6.6$$

total number $N_A$ (constant) of segment of molecular chain $$N_A=4.3281\times10^{26}$$

<Interface Model>
average segment number N during loaded deformation $$N=-5.9286+20.6175\lambda c-21.8168\lambda c^2+10.8227\lambda c^3-1.9003\lambda c^4$$

average segment number N (constant) during unloaded deformation $$N=3.91$$

total number $N_A$ (constant) of segment of molecular chain $$N_A=3.203\times10^{25}$$

In the deformation calculation, strain, stress and the like of the element are calculated for every constant time increment, and such values are sequentially recorded (step S37). The necessary physical quantity is taken out therefrom and is used for analysis (step S4 of FIG. 2).

Figure 11:
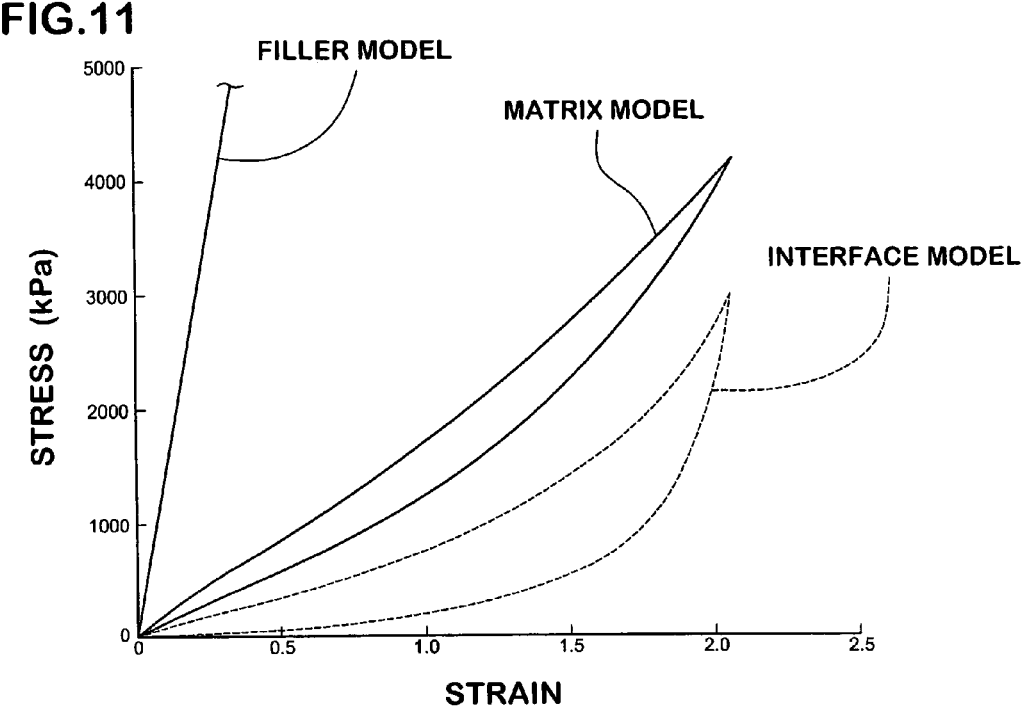
FIG. 11 is a view showing respective stress-strain curves of a matrix model, a filler model, and an interface model.

In FIG. 11, the results of the deformation calculation independently carried out on the matrix model 3, the filler model 4, and the interface model 5 are shown. The filler model 4 shows the highest elasticity, and no energy loss occurs. The interface model 5 shows a softer viscoelastic property and a greater energy loss (loop surface area defined by the curves) than the matrix model 3.

Figure 12:
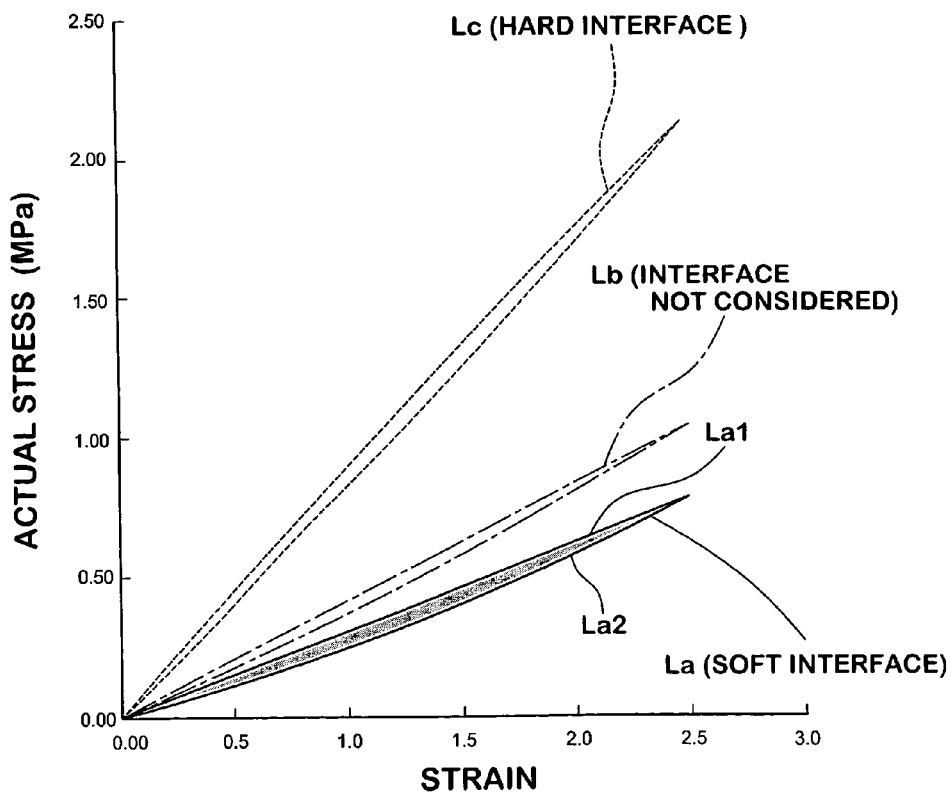
FIG. 12 is a graph showing a relationship between actual stress-strain as a simulation result of the viscoelastic material model (entire structure)

In FIG. 12, a relationship between the actual stress and the strain of the viscoelastic material entire model M is shown. The curve La shows the result of when the interface model 5 is made softer than the matrix model 3. In the curve La, a non-linear first curve La1 is obtained during the loaded deformation. A second curve La2 different from the first curve La1 is obtained during the unloaded deformation. The second curve La2 is softer (lower elasticity) than the first curve La1, and a hysteresis loop is produced. By calculating the enclosed surface area of such loop, the energy loss in one cycle of tensile deformation can be obtained. On the other hand, when the deformation calculation similar to that of Aruuda et al. is carried out with the average segment number N per one molecular chain as constant, the stress-strain curve thereof passes through the same path in both the loaded deformation and the unloaded deformation, as with FIG. 36, and thus the hysteresis loop is not obtained.

The shapes of the first and the second curves La1, La2 can be set to a variety of shapes by appropriately changing the coefficients A to E in equation (19). Therefore, by setting the coefficients A to E in accordance with the viscoelastic material to be analyzed, for example, the energy loss and the like can be accurately studied for each material. This is very useful in improving the performance of industrial goods such as tires, and golf balls that uses the viscoelastic material as the main part.

Further, in FIG. 12, the calculation result of the model in which the material property same as that of the matrix model 3 is given to the interface model 5, that is, the model not taking the interface into consideration, is shown as a curve Lb with an alternate long and short dash line. In this model, since there is no soft interface region in which the strain occurs greatly, the slope of the stress-strain curve is raised compared to the curve La. Further, since great energy loss is not likely to occur at the interface as with the interface model 5, the energy loss of the entire model is small.

Figure 13:
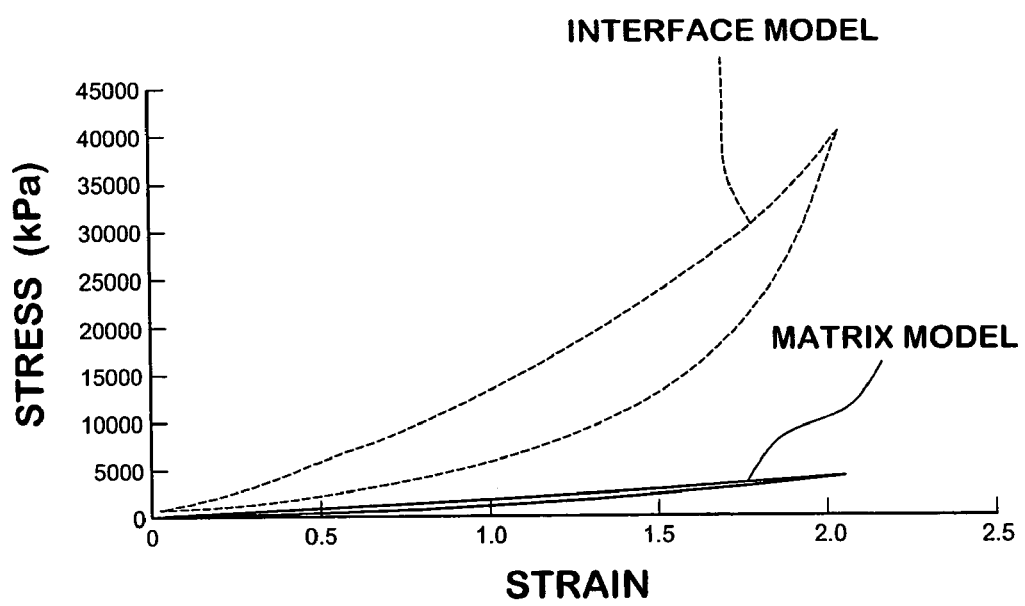
FIG. 13 is a view showing stress-strain curve showing another example of the matrix model and the interface model.

Further, in FIG. 12, the calculation result of the model having a viscoelastic property opposite of the curve La is shown as curve Lc with a chained line. In this model, the interface model 5 has a viscoelastic property harder than the matrix model 3 as shown in FIG. 13. It is recognized that the curve Lc has high elasticity, as expected. In the embodiment, the average segment number N of each model is set as the following:

<Matrix Model>
average segment number N during loaded deformation $$N=-3.2368+20.6175\lambda c-21.8168\lambda c^2+10.8227\lambda c^3-1.9003\lambda c^4$$

average segment number N (constant) during unloaded deformation $$N=6.6$$

total number $N_A$ (constant) of segment of molecular chain $$N_A=4.3281\times10^{26}$$

<Interface Model>
average segment number N during loaded deformation $$N=-5.4800+20.6175\lambda c-21.8168\lambda c^2+10.8227\lambda c^3-1.9003\lambda c^4$$

average segment number N (constant) during unloaded deformation $$N=4.36$$

total number $N_A$ (constant) of segment of molecular chain $$N_A=8.569\times10^{26}$$

In FIG. 14, the progressing process from the deformed state to the restored state of one microscopic structure (unit cell) in the simulation of tensile deformation of the viscoelastic material model 2 (curve La) is visually shown. It is to be noted that the processes are not continuous in the deformation calculation and an appropriate time interval is provided. FIGS. 14(A) to 14(E) show the loaded deformation and FIGS. 14(F) to 14(J) show the unloaded deformation. In FIG. 14, the level of stress is represented with change in color. The region where the color is changing white shows the region of great strain. This result accurately shows that great strain is concentrated between the interfaces of the filler model 4 or between the filler models 4, 4. Particularly, it can be seen that great strain occurs in a region where the distance between the filler models 4, 4 is small.

In FIG. 15, the strain distribution in the tension direction of each element under maximum strain is visually shown, where FIG. 15(A) corresponds to the curve Lb of FIG. 12 that does not take interface into consideration, and FIG. 15(B) corresponds to the curve La that takes interface into consideration. The figure shows that greater strain occurs in a region where the color is light. In FIG. 15(A) where the interface is not taken into consideration, strain occurs entirely and extensively and mildly, whereas in FIG. 15(B) where the interface is taken into consideration, the great strain is concentrated at the peripheral (or near the interface) of the filler model 4.

In FIG. 16, the energy loss of one cycle of strain for each element, and the sizes thereof are shown with a color. The figure shows that great energy loss occurs more in one cycle in a region where the color is light. The shape of the model is shown with the maximum deformed shape of FIG. 15. FIG. 16(A) corresponds to curve Lb of FIG. 12, and FIG. 16(B) corresponds to curve La of FIG. 12. In FIG. 16(B) where the interface is taken into consideration, it can be seen that great energy loss is concentrated at the interface of the filler model 4.

Figure 17:
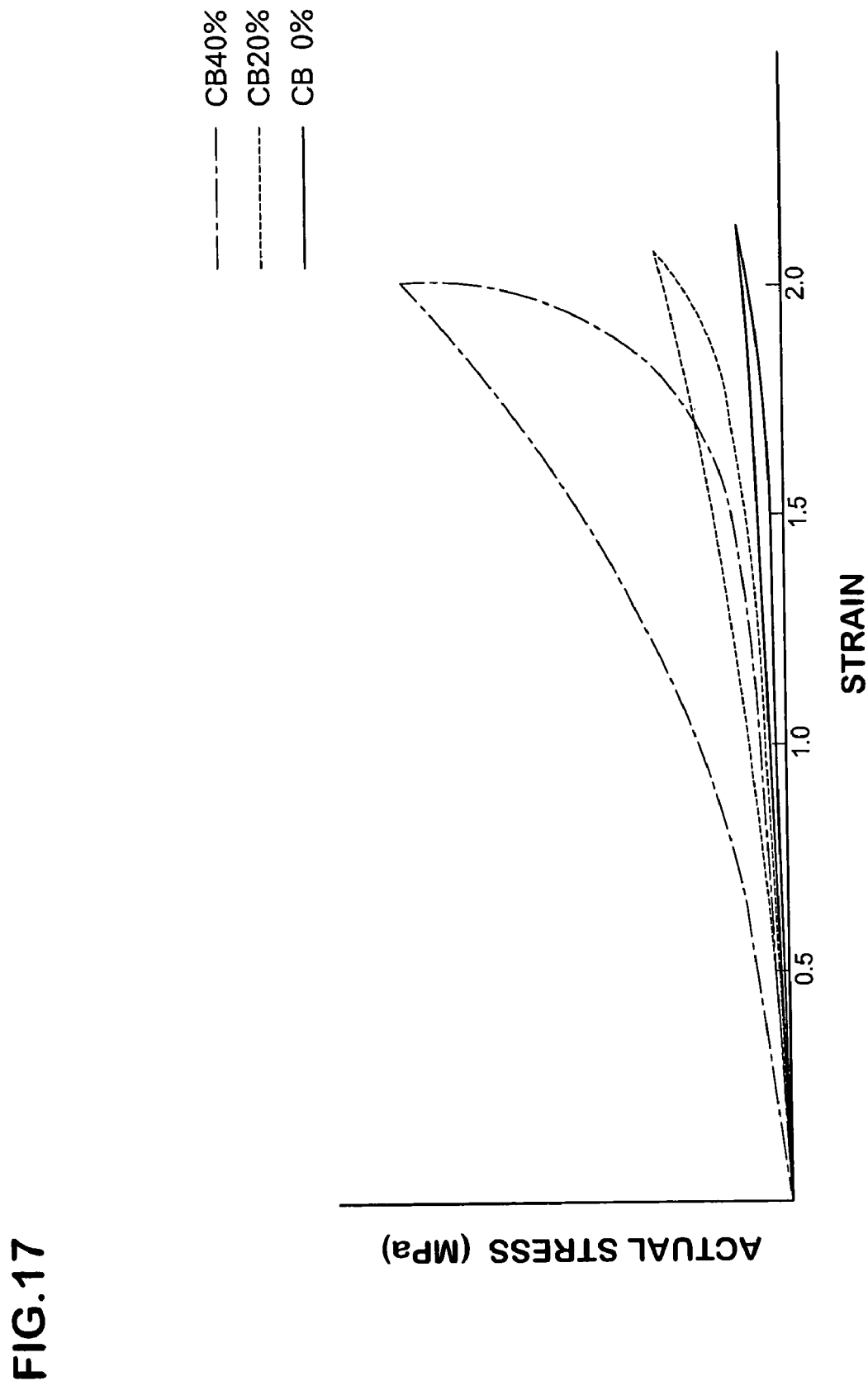
FIG. 17 is a graph showing tension test result of a rubber material having different blending amount of carbon black.

Another embodiment of the present invention will now be explained. In this embodiment as well, rubber blended with carbon black serves as a viscoelastic material for the object to be analyzed. In FIG. 17, stress-strain curves of rubber material with different blending amount CB of carbon black are shown. The rubber material having large blending amount CB of carbon black has large surface area of the hysteresis loop. Thus, the rubber material having large blending amount of filler tends to have large energy loss. One cause of this is thought to be due to interaction acting between the filler particles. That is, an inter-filler attractive force similar to van der Waals force is believed to act between two filler particles approaching at a level of a few nano in the rubber matrix. This theory is presently dominant. In the present embodiment, on the premise of the above mentioned embodiment, an attempt is made to consider the inter-filler attractive force in the deformation calculation.

Figure 18:
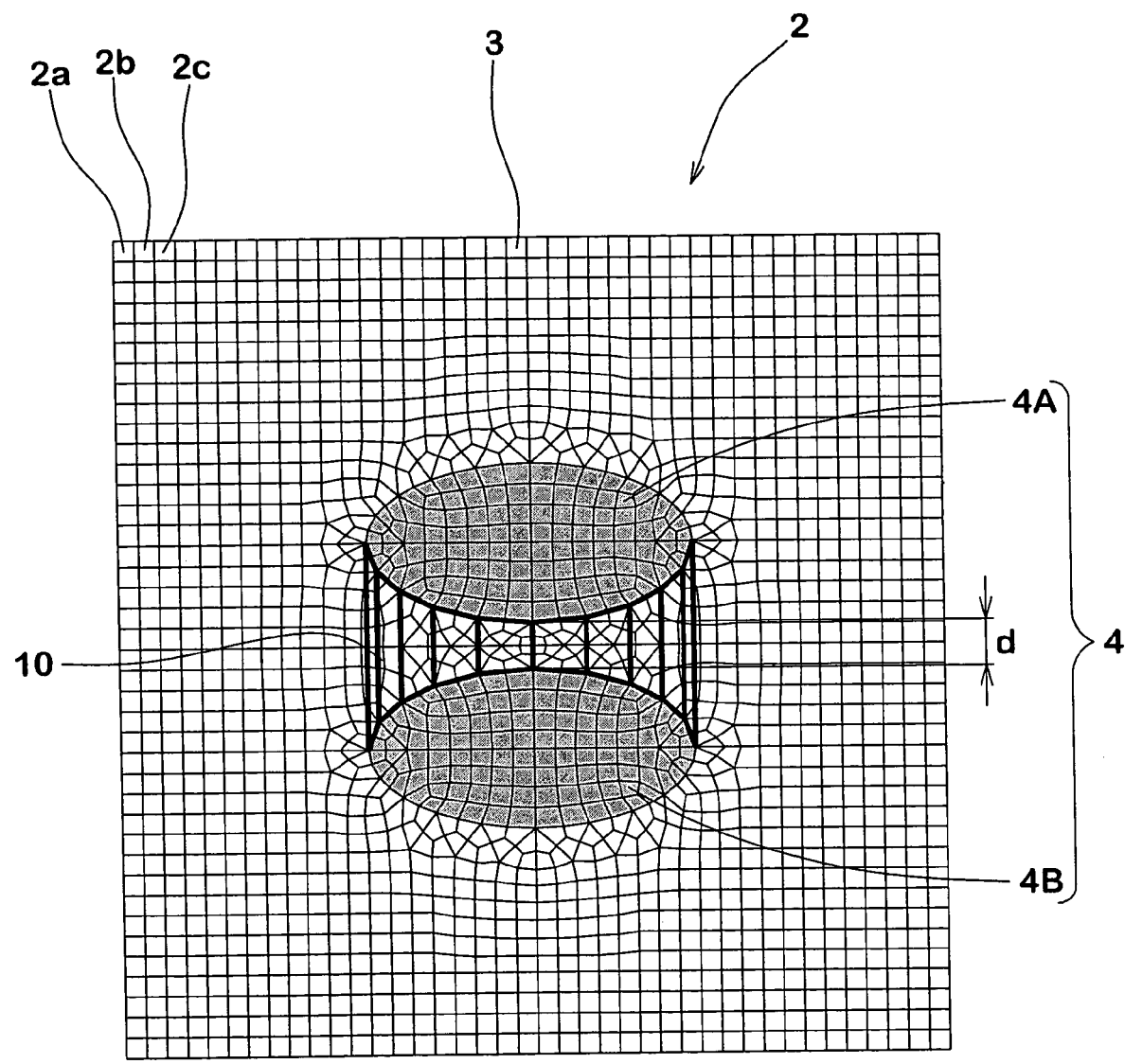
FIG. 18 is a diagram showing another embodiment of the viscoelastic material model (microscopic structure)

In FIG. 18, one example of the viscoelastic material model 2 serving as a microscopic structure is visually shown. The viscoelastic material model 2 of this example includes the matrix model 3 in which the matrix rubber is divided, a filler model 4A, 4B (collectively referred to as simply "filler model 4") in which at least two filler particles arranged with a spacing in between is divided, and an inter-filler model 10 arranged between the two filler models 4A, 4B and has an inter-filler attractive force that changes in accordance with the distance between the filler models 4A, 4B. This viscoelastic material model does not include the interface model. To enhance the calculation efficiency, the microscopic structure (unit cell) of the viscoelastic material model 2 is formed so as to be symmetrical with respect to each center line of the x-axis and the y-axis.

In the calculation, the matrix model 3 and the filler model 4 are defined the same way as in the above mentioned embodiment. In this example, the two filler models 4 each have an elliptical shape and are of the same size. The filler model 4A, 4B are separated by a smallest distance d(d≠0) and does not contact each other. The initial smallest distance d between the filler model 4A and the filler model 4B is desirably selected within a range of, for example, about 1 to 3 nm. It is to be noted that such value may be changed in accordance with the position of the filler model 4, the conditions of the simulation and the like.

Figure 19:
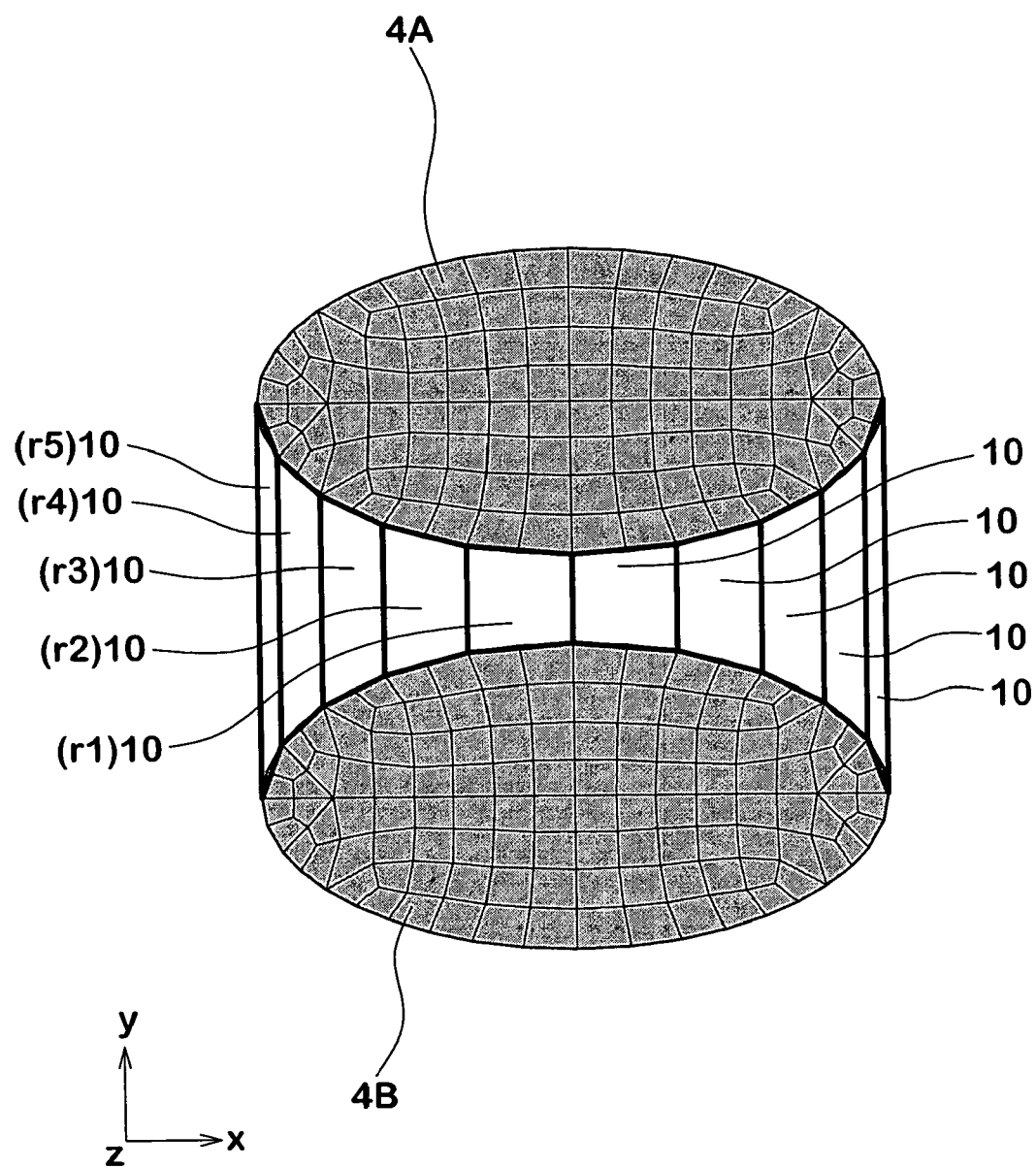
FIG. 19 is an enlarged view of a main part of FIG. 18.

As shown in FIG. 18 and shown enlarged in FIG. 19, the inter-filler model 10 is arranged between the filler model 4A and the filler model 4B. Thus, the inter-filler model 10 overlaps the matrix model 3 in the direction of the z-axis. In this example, each inter-filler model 10 is a quadrilateral element. In one inter-filler model 10, two nodes are shared with nodes on the outer peripheral surface of one of the filler model 4A, and the remaining two nodes are shared with nodes on the outer peripheral surface of the other filler model 4B. Therefore, in the deformation calculation, when the distance d between the two filler models 4A, 4B changes, the coordinate of each node of the inter-filler model 10 changes, thereby changing the shape (surface area) thereof.

The inter-filler attractive force is defined by the inter-filler model 5. For example, the inter-filler attractive force can be defined with reference to the following article in which an adhesive force acting on the interface when the phase II particle is debonded from a metal matrix layer is formulated.

A Continuum Model for Void Nucleation by Inclusion Debonding/A. Needleman (Journal of Applied Mechanics SEP. 1987 Vol. 54 P. 525-531)

Figure 20A:
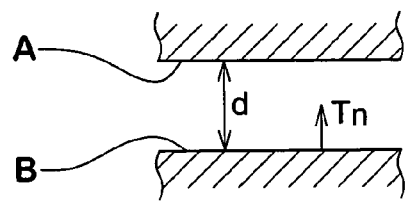
FIG. 20(A) is a cross sectional view of the interface.
Figure 20B:
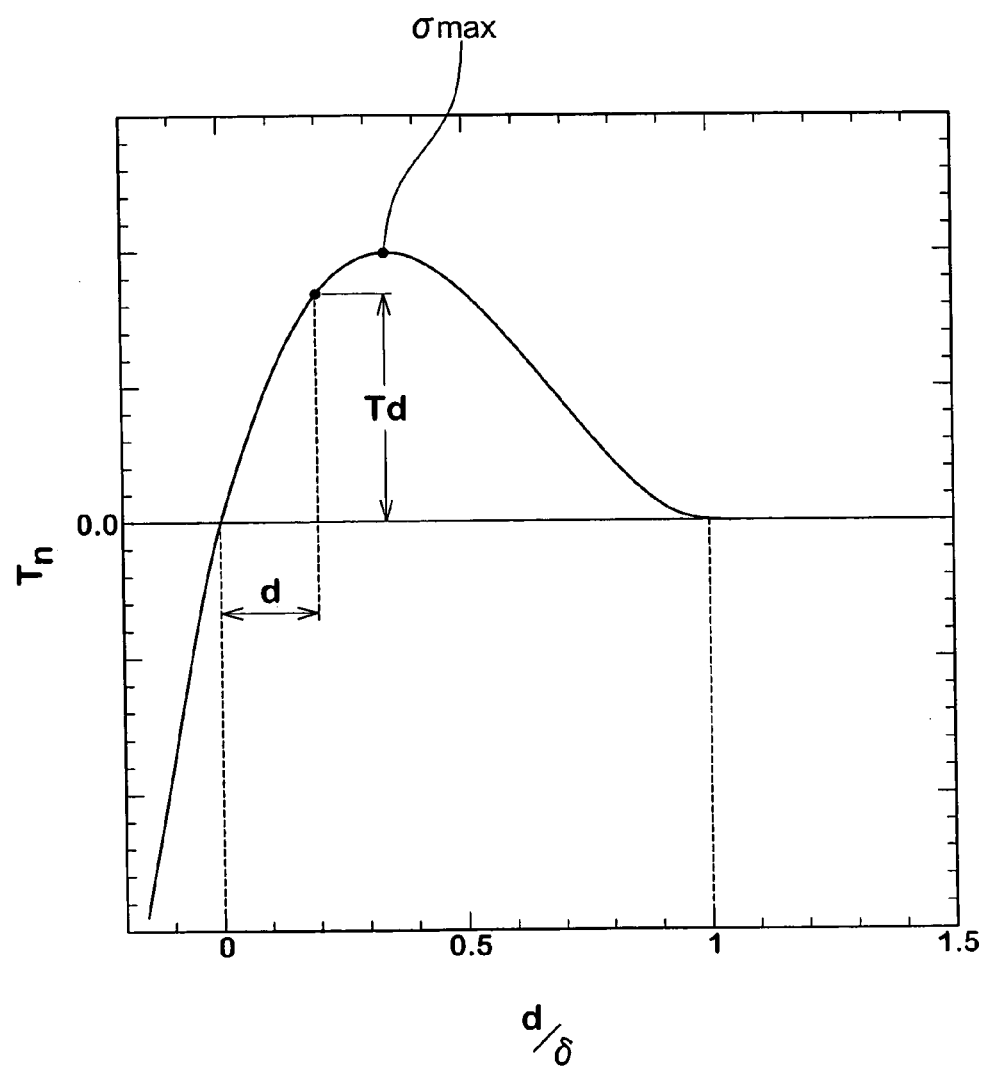
FIG. 20(B) is a graph showing a relationship of the attractive force Tn and the distance d between interfaces.

FIG. 20(A) shows a diagram of interfaces A, B to which debonding is started, proposed by Needleman et al. In the present embodiment, the interfaces A, B correspond to the outer peripheral surfaces of the filler models 4A, 4B. In FIG. 20(B), a relationship between the attractive force Tn produced between the interfaces A, B and the distance d is shown. The δ on the horizontal axis of FIG. 20(B) is the limiting length of when the attractive force Tn becomes zero when the distance d between the interfaces A, B is increased, and this length is hereinafter referred to as a characteristic length. The attractive force Tn between the interfaces A, B is determined by a function for a parabolic curve including a gradually increasing region in which the attractive force smoothly increases and reaches a peak (σ max) with the increase in distance d, and a gradually decreasing region in which the attractive force smoothly decreases and reaches zero at a pre-set characteristic length with a further increase in distance d. This function is defined, two-dimensionally, as equation (23).

$$T_n = \frac{27}{4}\sigma_{max}\left\{\frac{u_n}{\delta_n}\left[1 - 2\sqrt{\left(\frac{u_n}{\delta_n}\right)^2 + \left(\frac{u_s}{\delta_s}\right)^2} + \left(\frac{u_n}{\delta_n}\right)^2 + \left(\frac{u_s}{\delta_s}\right)^2\right]\right\} \quad (23)$$

Figure 21:
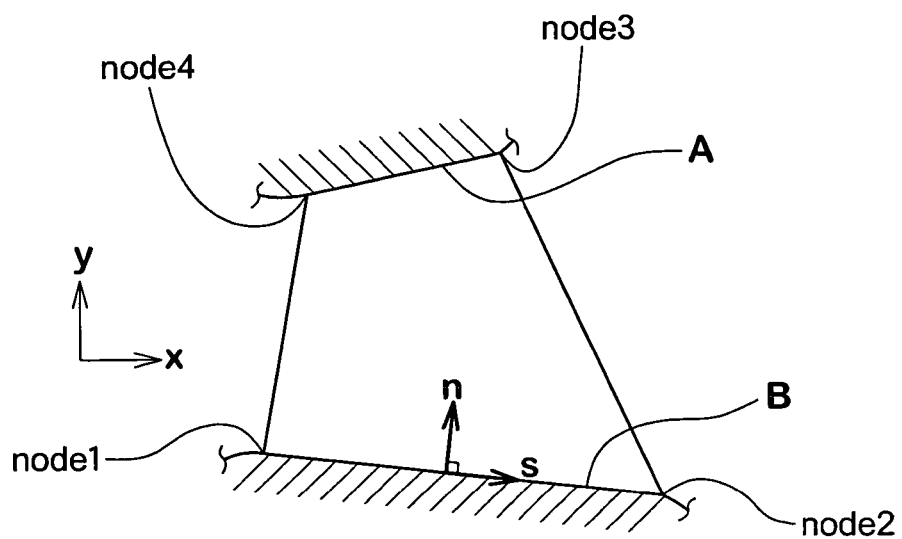
FIG. 21 is a diagram showing an enlarged view of between interfaces.

Here, $u_n$, $u_s$ are each relative displacement of the normal line and the tangent line in the interfaces A, B, and $\delta_n$, $\delta_s$ are characteristic lengths of the normal line and the tangent line. The normal line n and the tangent line s are as shown in FIG. 21.

In the present embodiment, the inter-filler attractive force is determined with the above equation (23). In case of the viscoelastic material model 2, it is assumed that the distance d in the initial state is not equal to zero, but the inter-filler attractive force in the initial state is zero, between the filler model 4A, 4B. Thus, the following correction is made to the equation (23).

First, to adopt the initial distance d between the filler models 4A, 4B, a graph of FIG. 20(B) is shifted by —d along the horizontal axis (initial distance between the filler models) and is shifted by —Td (attractive force) along the vertical axis. This graph is expressed in equation (24). Therefore, in the simulation of the present embodiment, the inter-filler attractive force corresponding to the distance d between the filler models 4A, 4B is derived from equation (24).

$$T_n = \frac{27}{4}\sigma_{max}\left\{\frac{u_n + d_n}{\delta_n}\left[1 - 2\sqrt{\left(\frac{u_n + d_n}{\delta_n}\right)^2 + \left(\frac{u_s + d_s}{\delta_s}\right)^2} + \left(\frac{u_n + d_n}{\delta_n}\right)^2 + \left(\frac{u_s + d_s}{\delta_s}\right)^2\right] - \frac{d_n}{\delta_n}\left[1 - 2\sqrt{\left(\frac{d_n}{\delta_n}\right)^2 + \left(\frac{d_s}{\delta_s}\right)^2} + \left(\frac{d_n}{\delta_n}\right)^2 + \left(\frac{d_s}{\delta_s}\right)^2\right]\right\} \quad (24)$$

-continued $$T_S = \frac{27}{4}\gamma\sigma_{max}\left\{\frac{u_S+d_S}{\delta_S}\left[1-2\sqrt{\left(\frac{u_n+d_n}{\delta_n}\right)^2+\left(\frac{u_S+d_S}{\delta_S}\right)^2}+\right.\right.$$
$$\left(\frac{u_n+d_n}{\delta_n}\right)^2+\left(\frac{u_S+d_S}{\delta_S}\right)^2\right]-\frac{d_S}{\delta_S}$$
$$\left.\left[1-2\sqrt{\left(\frac{d_n}{\delta_n}\right)^2+\left(\frac{d_S}{\delta_S}\right)^2}+\left(\frac{d_n}{\delta_n}\right)^2+\left(\frac{d_S}{\delta_S}\right)^2\right]\right\}$$

Figure 22:
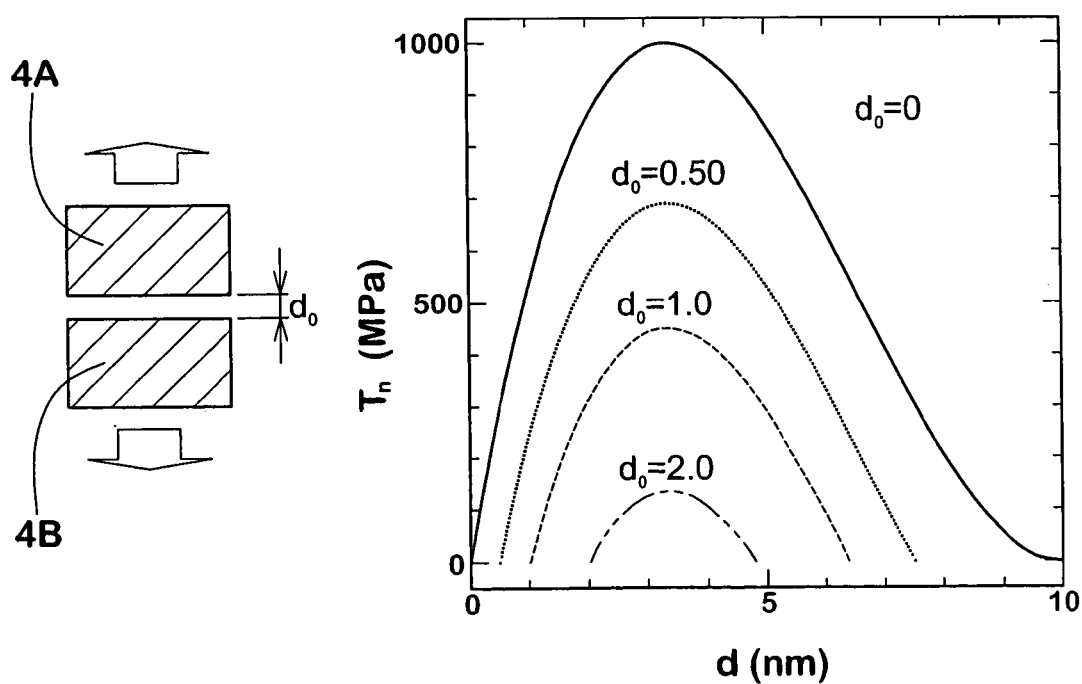
FIG. 22 is a graph showing a relationship of the attractive force Tn and the distance d between the filler models.

In FIG. 22, one example of a function for determining the attractive force Tn when the initial distance $d_0$ between the filler models 4A, 4B is changed to various values is shown. The characteristic length $\delta$ is, for example, approximately 11 nm when the initial distance $d_0=0$, and is approximately 4.8 nm when the initial distance $d_0=2.0$ nm. Thus, the initial distance $d_0$, and the characteristic length $\delta$ are appropriately set in accordance with the condition.

Figure 23:
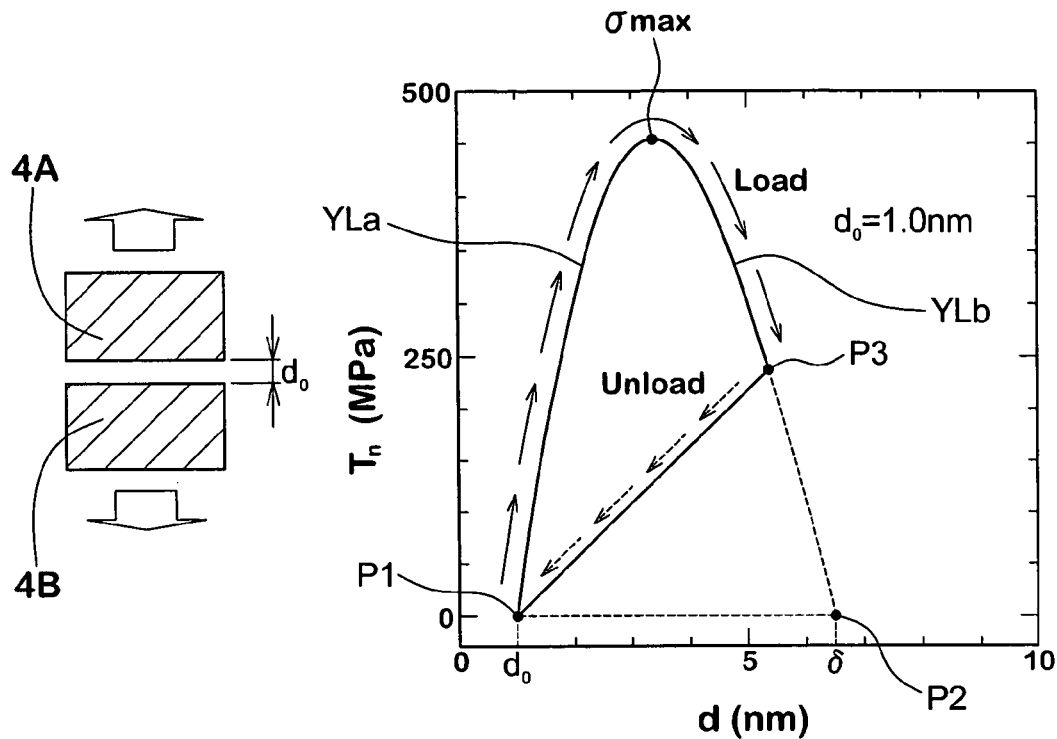
FIG. 23 is a graph explaining loaded deformation and unloaded deformation between the filler models.

In FIG. 23, a case in which the initial distance d0=1.0 nm is given as an example of inter-filler attractive force Tn. The equation (24) expressing the inter-filler attractive force Tn is, in the loaded deformation of filler model 4A, 4B, a function for a parabolic curve including a gradually increasing region YLa in which the attractive force gradually increases from point P1 of d=1.0 nm and reaches a peak σ max with the increase in distance d, and a gradually decreasing region YLb in which the attractive force gradually decreases and reaches zero at point P2 of a pre-set characteristic length $\delta$ with the further increase in distance d. When the distance d is greater than the characteristic length $\delta$, no inter-filler attractive force acts between the filler models 4A, 4B.

In the unloaded deformation from the gradually decreasing region YLb, the inter-filler attractive force Tn is set so as to linearly decrease from a value of start of unloading to a value of zero. For instance, if unloading of the load is started from an arbitrary point P3 on the gradually decreasing region YLb, as shown with a chained line arrow, the inter-filler attractive force Tn linearly decreases with values on a linear line connecting the relevant point P3 and the point P1 in accordance with the distance d. The attractive force Tn during such unloading is derived from the following equation (25).

$$T_n = \frac{27}{4}\sigma_{max}\left\{\frac{u_n+d_n}{\delta_n}(1-2v_{max}+v_{max}^2)-\right.\quad(25)$$
$$\left.\frac{d_n}{\delta_n}\left[1-2\sqrt{\left(\frac{d_n}{\delta_n}\right)^2+\left(\frac{d_S}{\delta_S}\right)^2}+\left(\frac{d_n}{\delta_n}\right)^2+\left(\frac{d_S}{\delta_S}\right)^2\right]\right\}$$

$$T_S = \frac{27}{4}\gamma\sigma_{max}\left\{\frac{u_S+d_S}{\delta_S}(1-2v_{max}+v_{max}^2)-\right.$$
$$\left.\frac{d_S}{\delta_S}\left[1-2\sqrt{\left(\frac{d_n}{\delta_n}\right)^2+\left(\frac{d_S}{\delta_S}\right)^2}+\left(\frac{d_n}{\delta_n}\right)^2+\left(\frac{d_S}{\delta_S}\right)^2\right]\right\}$$

$$\text{where } v = \sqrt{\left(\frac{u_n+d_n}{\delta_n}\right)_{max}^2+\left(\frac{u_S+d_S}{\delta_S}\right)_{max}^2}\ (u_n, u_S$$

at the start of unloading)

Therefore, when the inter-filler attractive force Tn exceeds the peak σ max, a closed loop is formed at one cycle of loading and unloading of the load. The inter-filler attractive force determined by a function for such closed loop expresses the hysteresis loss produced between the first filler model and the second filler model. If the attractive force Tn does not exceed the peak σ max, or is in the unloaded deformation from the gradually increasing region, the attractive force is determined through the same route as the loaded deformation.

The inter-filler model 10 does not have its own rigidity as with the matrix model 3. In other words, the inter-filler model 10 is provided to calculate the inter-filler attractive force using the equation (24) and the equation (25). Each inter-filler model 10 is not divided in a direction traversing between the filler models 4A and 4B. Therefore, the shape of the inter-filler model 10 is simply determined by the relative position of the filler models 4A and 4B for each deformation, as mentioned above.

From equation (24) and equation (25), the inter-filler attractive force (interaction force) per unit surface area between the filler models 4A, 4B is calculated. This inter-filler attractive force is, as shown in FIG. 21, replaced by a force acting on the four nodes 1 to 4. Thus, the inter-filler attractive force acts on the matrix model 3 sandwiched between the filler models 4A, 4B and compresses the matrix model 3.

Figure 24:
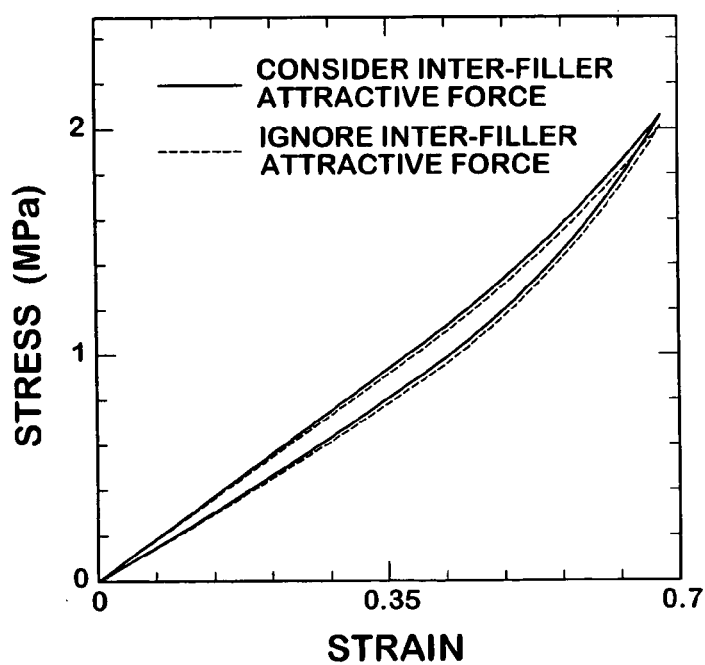
FIG. 24 is a graph showing a relationship of actual stress-strain as a simulation result of the entire viscoelastic entire model.

The deformation calculation is carried out under the same above mentioned condition using the above viscoelastic material model 2. In FIG. 24, a relationship between the actual stress and the strain in the entire viscoelastic entire model periodically including the microscopic structure of FIG. 18 is shown. In FIG. 18, a solid line shows the result about the viscoelastic material model 2 in which the inter-filler attractive force is defined between the filler models 4A and 4B, and the broken line shows the result about the model 2 in which the attractive force is not defined. The simulation of the present embodiment in which the inter-filler attractive force is considered rather hard compared to a case in which the inter-filler attractive force is ignored. When the inter-filler attractive force is taken into consideration, the surface area of the closed loop showing the energy loss is increased by 0.929% with respect to when the inter-filler attractive force is ignored. This corresponds to the amount of energy loss involved in the inter-filler attractive force. This value can be changed by setting of the parameters. Further, in the present embodiment, two filler models 4A, 4B are arranged in the microscopic structure (cell unit) but by changing the density of the filler model 4 in accordance with, for example, the blending ratio of the filler in the rubber material to be analyzed, more accurate evaluation or comparison of the energy loss becomes possible.

Figure 25:
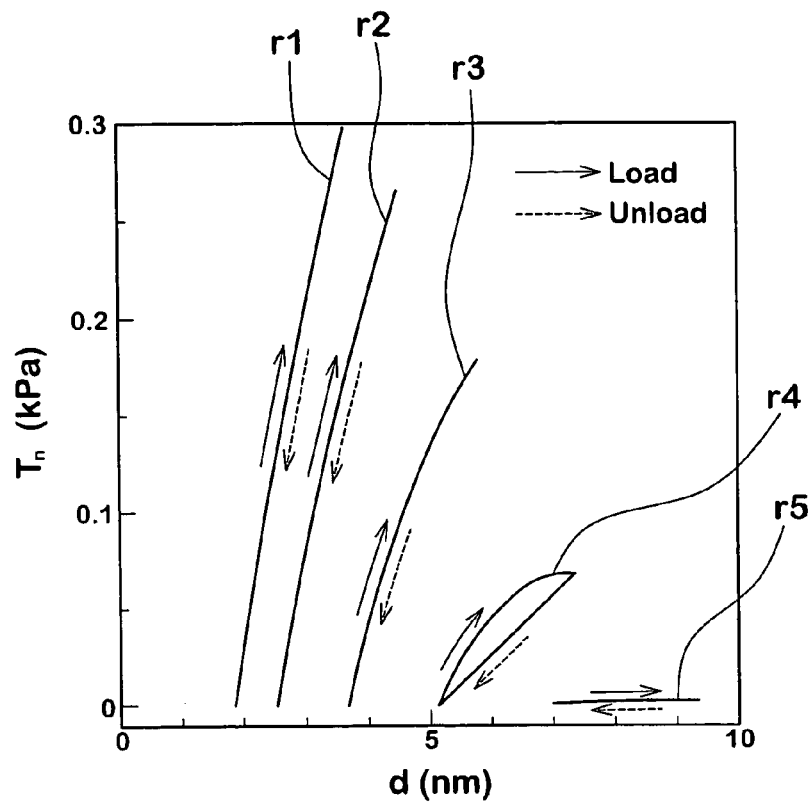
FIG. 25 is a graph showing a relationship of attractive force produced between each filler model and distance d.

In FIG. 25, the relationship between the attractive force produced between each inter-filler model 10 and the distance d is shown. The reference characters r1, r2, r3, r4 and r5 in the figure correspond to each element of the inter-filler model shown by reference characters r1, r2, r3, r4 and r5 of FIG. 19. Elements r1, r2 and r3 does not exceed the peak 6 max because the change of distance d is small. Thus, the attractive force Tn is considered to be the same for the loaded and the unloaded deformation. With regards to element r5, the initial distance d is originally large and thus no inter-filler attractive force is produced. With respect to element r4, however, the load is unloaded after the attractive force Tn has exceeded the peak, and thus is thought to have passed paths different for the loaded and the unloaded deformation, and thus the hysteresis loop is formed.

A simulation method for quantitatively understanding the interaction between the fillers will now be explained. In this embodiment as well, the rubber blended with for example, carbon black serves as the viscoelastic material, and is the object of analysis. In this embodiment, a potential energy is calculated as a variable representing the interaction between the fillers. In this simulation, the computer apparatus 1 shown in FIG. 1 is preferably used.

Figure 26:
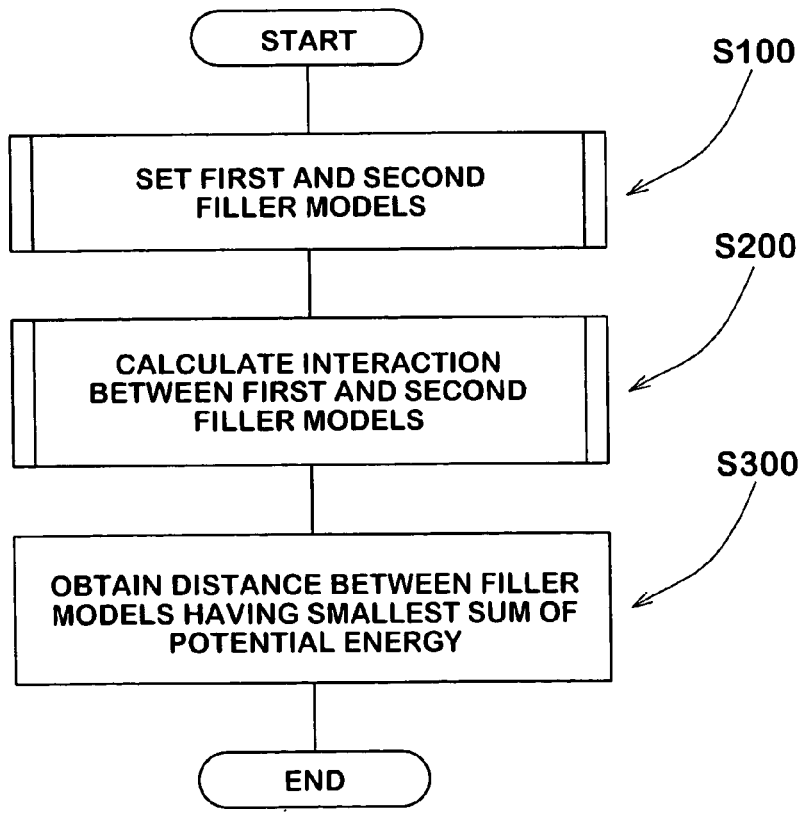
FIG. 26 is a flow chart showing another embodiment of the simulation.

In FIG. 26, one example of procedures of the simulation method of the present embodiment is shown. In the preset embodiment, a model setting step for setting a first filler model and a second filler model is first carried out (step S100).

Figure 27:
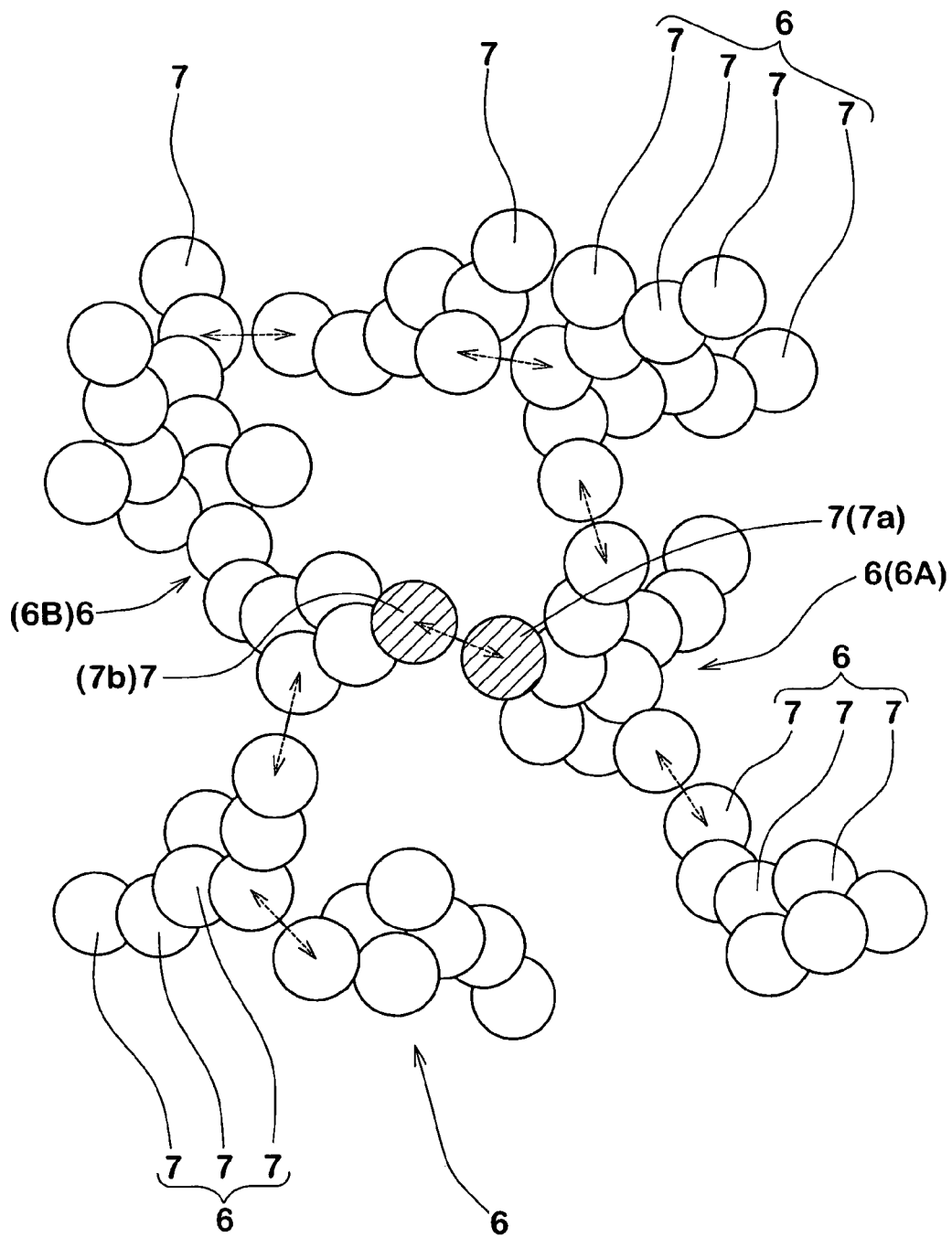
FIG. 27 is a schematic view showing an enlarged view of a plurality of secondary particles of the carbon black.

In FIG. 27, a plurality of secondary particles of carbon black 6 in the rubber polymer imaged with an electronic microscope is shown. The secondary particle of carbon black 6 is configured by irregularly bonding a plurality of sphere primary particles 7 three-dimensionally, as mentioned above. The simulation of the present embodiment focuses on the two secondary particles 6A, 6B spaced apart from each other. The most approached parts of the secondary particles 6A, 6B, that is, in the example of FIG. 27, one primary particle 7a of the secondary particle 6A and one primary particle 7b of the secondary particle 6B are modeled to analyze the interaction between such approached parts. More specifically, as visually shown in FIG. 28, the primary particle 7a is modeled to a first filler model Fm1 and the primary particle 7b is modeled to a second filler model Fm2, respectively.

Figure 29:
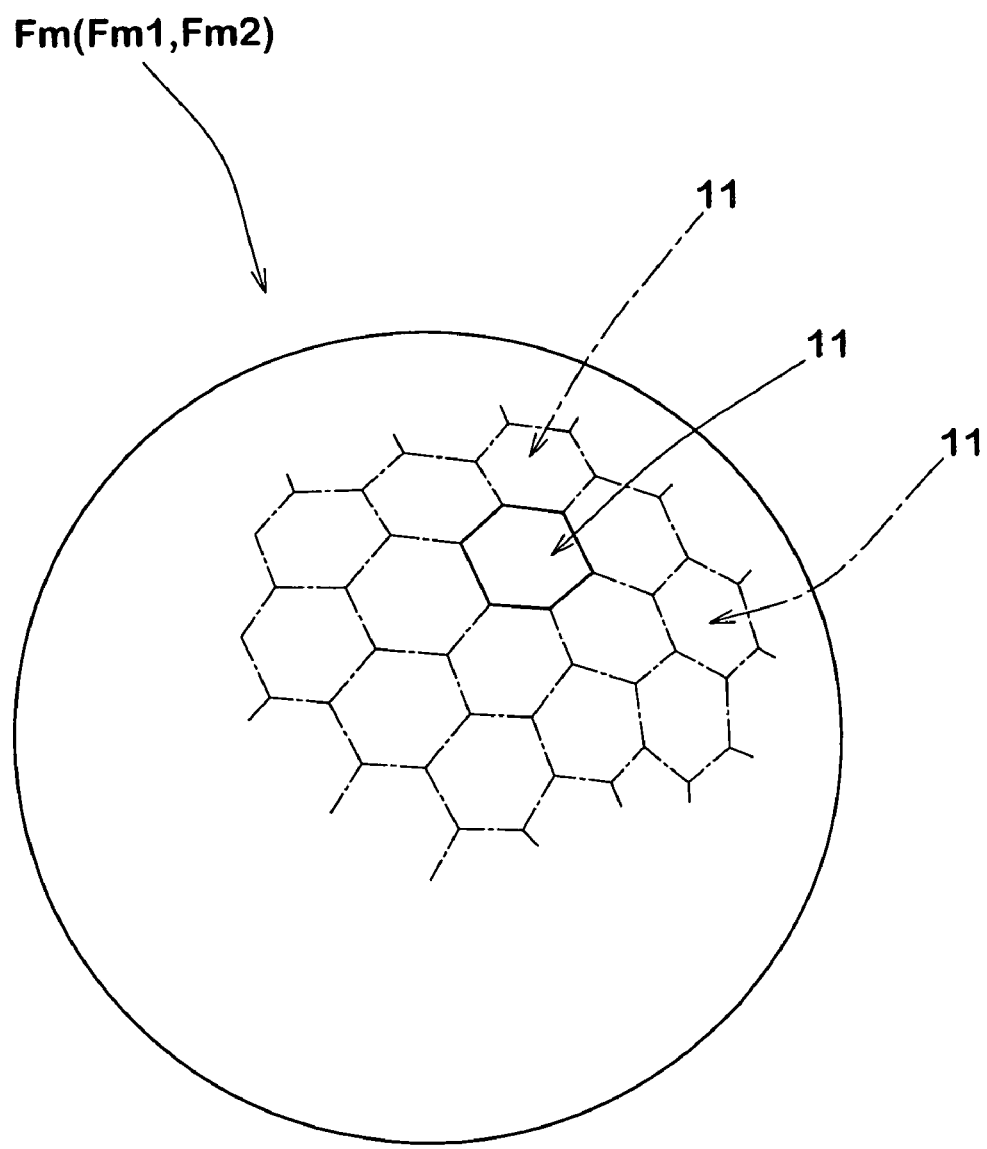
FIG. 29 is a schematic enlarged view of the filler model.

The primary particle 7 of carbon black is a collective of carbon atoms. Therefore, the filler model Fm (simply referred to as filler model Fm when collectively referring to the first and the second filler models) in which the primary particle 7 is modeled preferably expresses a plurality of carbon atoms in the calculation. The filler model Fm of the present embodiment is, as visually shown in FIG. 29, shown as an assembly of a substantially hexagonal basic structure 11.

Figure 30A:
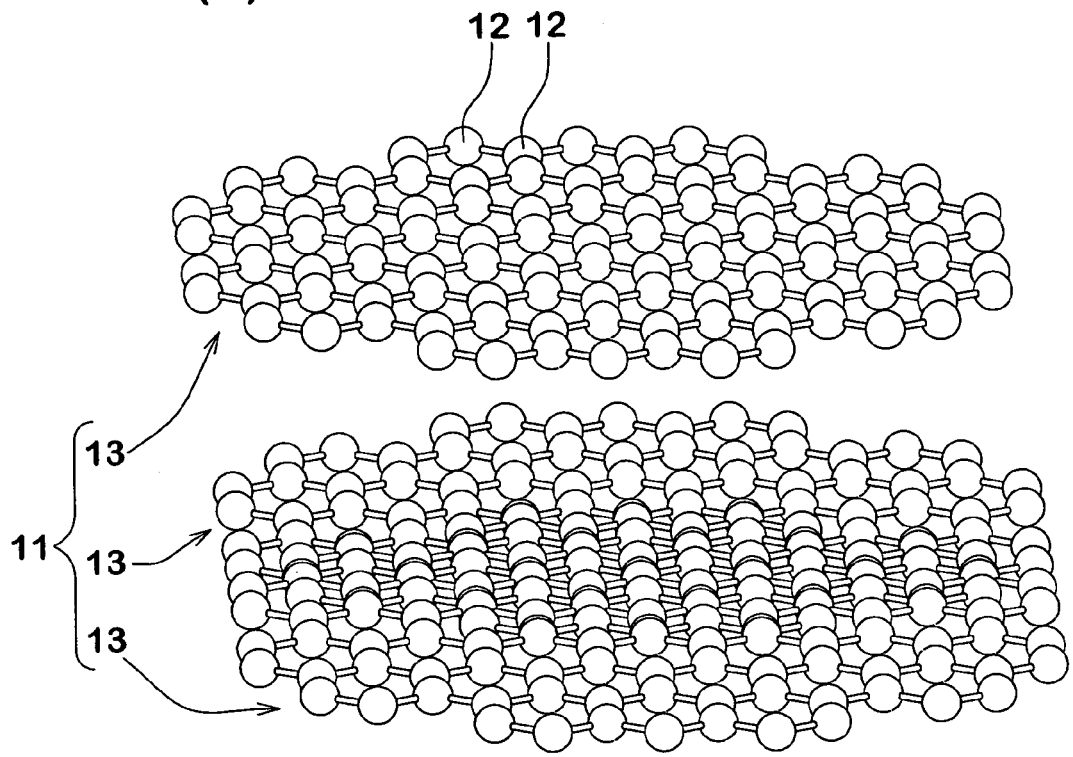
FIG. 30(A) is a perspective view of a basic structure of the filler model.
Figure 30B:
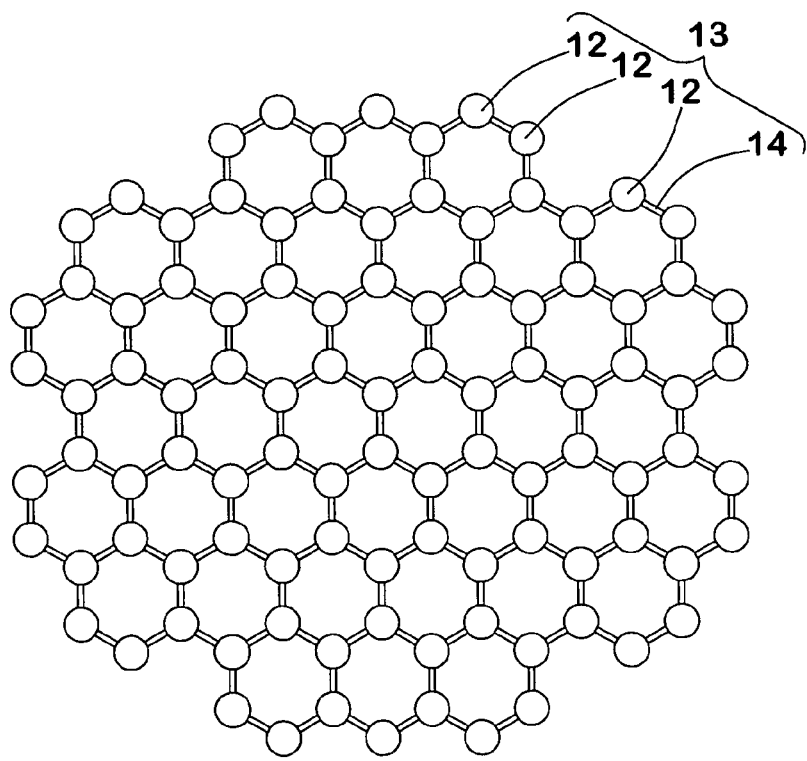
FIG. 30(B) is a plan view of a network array constituting the basic structure.

FIG. 30(A) shows a perspective view of the visualized basic structure 11. The basic structure 11 is configured by superimposing a plurality of network arrays 13. In this example, for example, 3 to 5 layers of the network array 13 are stacked. The network array 13 includes a plurality of carbon atom model (filler-atom model) 12 and a plurality of arm models 14 for bonding the carbon atom model 12 to a hexagon in a common plane. The network array 13 is configured by arranging and bonding about 90 carbon atom models 12 on each apex of the regular hexagon by way of the arm model 14, as shown in FIG. 30(B). Due to the arm model 14, the relative position of each carbon atom model 12 does not change.

Figure 31A:
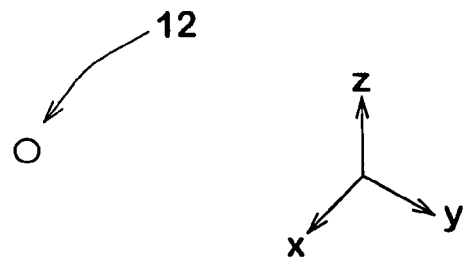
FIGS. 31(A) and 31(B) are diagrams explaining an example of setting of the filler model.
Figure 31B:
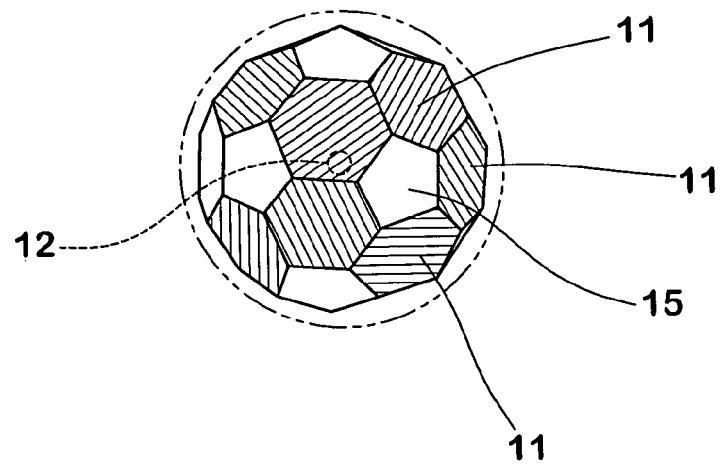
Figure 31C:
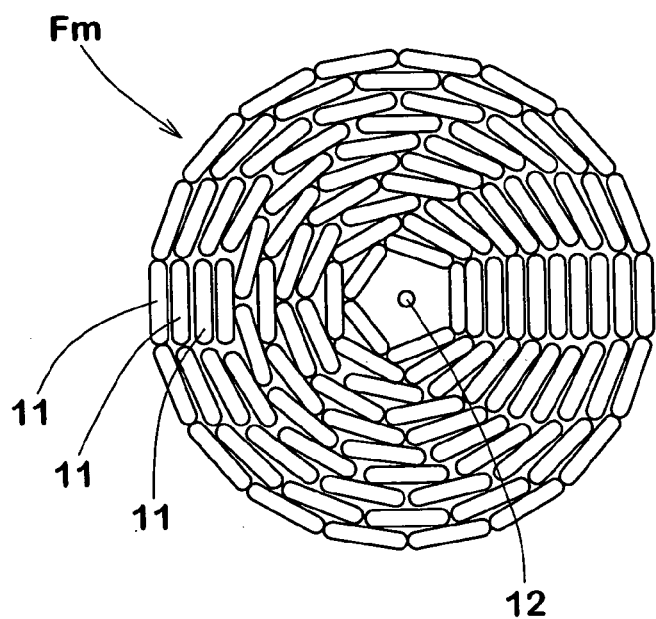
FIG. 31(C) is a schematic cross sectional view of the filler model.

The filler model Fm may be hollow, but desirably have carbon atom model 12 arrayed interiorly. This is based on a general knowledge of the present carbon particle. FIG. 31 shows one example of the method of setting the filler model Fm. First, as shown in FIG. 31(A), one carbon atom model 12 constituting the center of the filler model Fm is provided on a three-dimensional coordinate. Next, the basic structure 11 is arranged around the central carbon atom model 12 so as to surround the relevant carbon atom model. Here, the basic structure 11 does not need to configure a surface of a complete regular polyhedron and an open location 15 may be appropriately provided. By repeating this task sequentially, the filler model Fm interiorly having multiple carbon atom models 12 is obtained, as shown in a cross sectional view of FIG. 31(C). The maximum diameter of the filler model Fm is desirably between, for example, 10 to 200 nm with reference to the actual shape, and the one filler model Fm preferably includes about ten thousand to one billion carbon atom models 12.

By fixing the set filler model Fm to an arbitrary X-Y-Z coordinate system, a center of gravity coordinate of all the carbon atom models 12 included in the relevant filler model Fm is determined. In each of the filler model Fm1, Fm2, an inherent number starting from 1 is allocated to each carbon atom model 12 in a sequential order. This number is stored in the computer apparatus 1 in relation to the coordinate and the like of the relevant carbon atom model 12.

Figure 28:
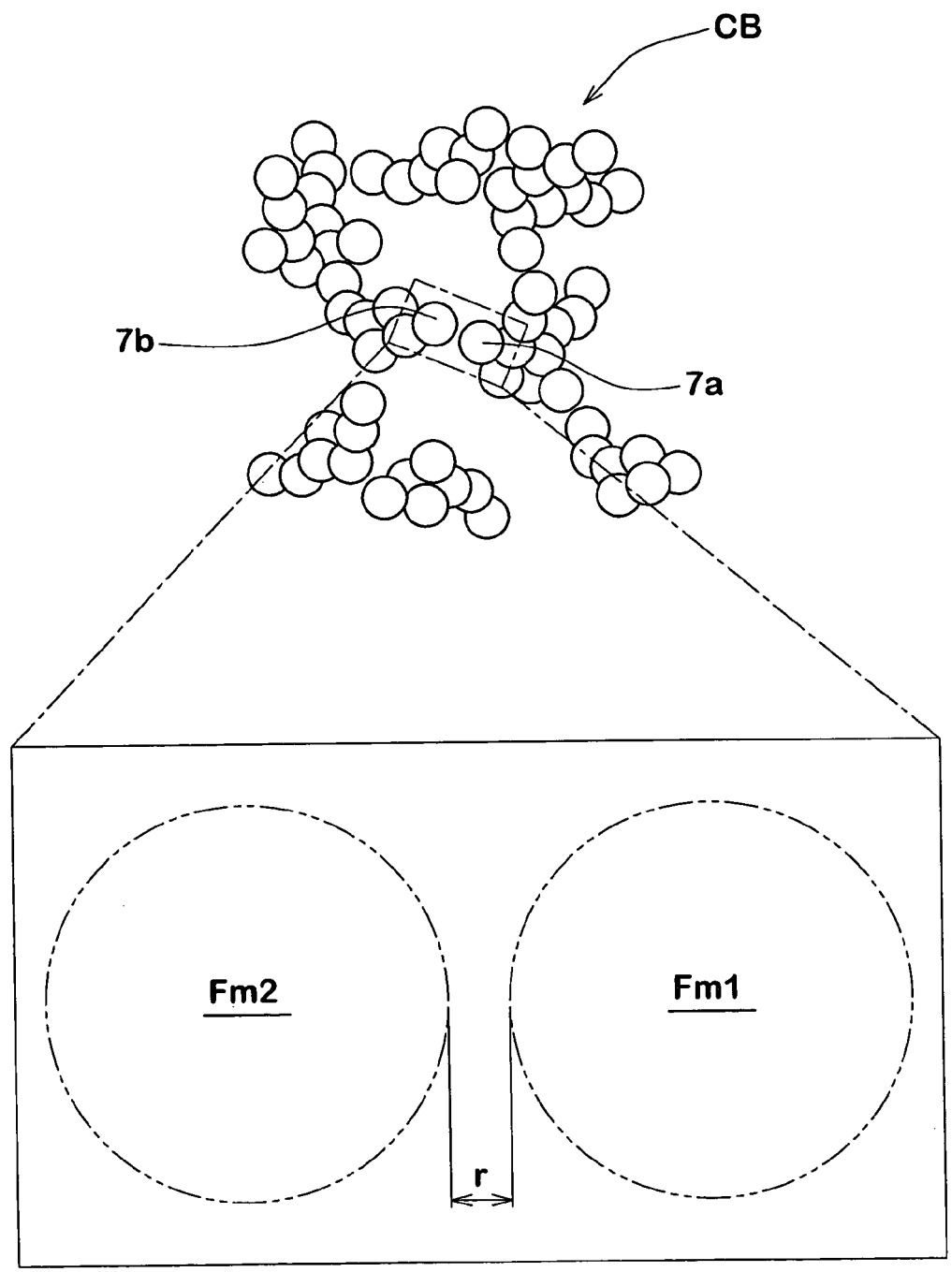
FIG. 28 is a schematic view explaining modeling of a primary particle of the carbon black.

As shown in FIG. 28, the first filler model Fm1 and the second filler model Fm2 are separated by a distance r. The distance r is desirably determined from a range of for example, about 0.1 to 1.5 nm, and in the present embodiment, 0.3 nm is set as the initial value.

Figure 32:
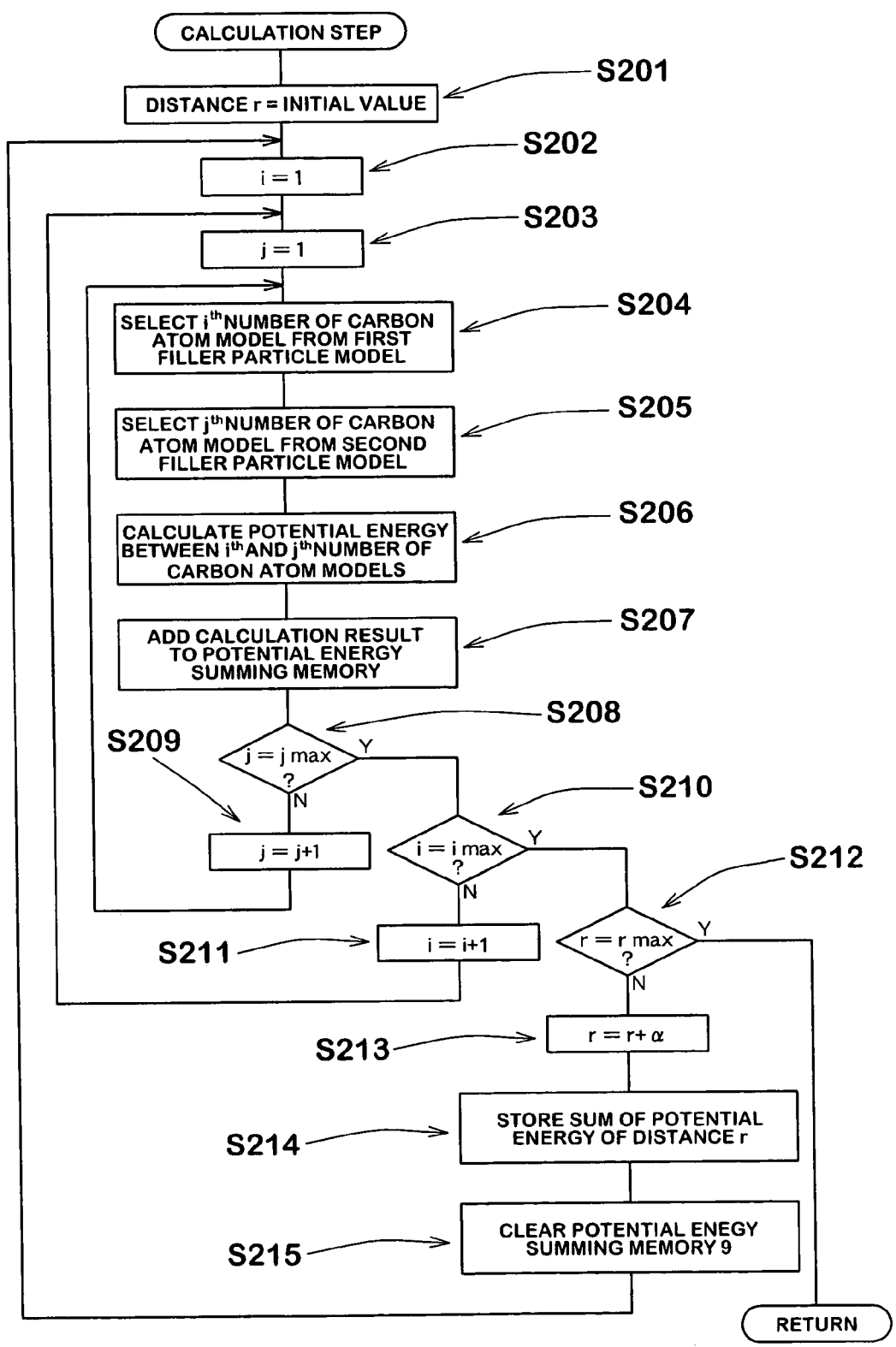
FIG. 32 is a flow chart showing one example of a process of a calculation step.

In the present embodiment, a calculation step for calculating the interaction between the filler particles acting between the first filler model Fm1 and the second filler model Fm2 is carried out using the computer apparatus (step S200). In FIG. 32, one example of a specific process of the calculation step is shown.

In this example, the distance r between the first filler model Fm1 and the second filler model Fm2 is first set to a pre-set initial value (0.3 nm in the present example) (step S201), and the variables i, j are initialized to 1 (step S202, S203). The variables i, j each correspond to the inherent number allocated to the carbon atom model 12. These include values i max, j max equal to the maximum value of the number of each carbon atom model 12.

The $i^{th}$ number of carbon atom particle model is selected from the first filler model Fm1, and the $j^{th}$ number of the carbon atom model is selected from the second filler model Fm2 (step S204, S205) and the potential energy between the two models is calculated (step S206). The potential energy acting between the atoms spaced apart from each other can be obtained through various theoretical formulas. In this example, the Leonard-Jones potential energy calculation formula expressed in the following equation (26) is used.

$$\phi = 4 \times 0.004783 \left[ \left( \frac{0.3345}{R} \right)^{12} - \left( \frac{0.3345}{R} \right)^{6} \right] \quad (26)$$

The Leonard-Jones potential energy calculation formula expresses the potential energy in which a close repulsive force is added to the attractive force by the van der Waals force, which formula has a relatively good accuracy and is generally widely used. However, other calculating formulas may also be used. In equation (26), the potential energy $\phi$ is derived as a function of the separating distance R of the carbon atom models 12, 12. Therefore, the distance R between the $i^{th}$ number of carbon atom model 12 of the first filler model Fm1 and the $j^{th}$ number of the carbon atom model 12 of the second filler model Fm2 is calculated prior to calculating the potential energy.

The distance R can be easily calculated using the coordinate of the $i^{th}$ number of carbon atom model 12 and the coordinate of the $j^{th}$ number of carbon atom model 12. After the distance R between the carbon atom models is calculated, the potential energy produced between the $i^{th}$ number of carbon atom particle model of the first filler model Fm1, and the $j^{th}$ number of the carbon atom model of the second filler model Fm2 is calculated based on equation (26).

Next, a process for adding the value of the calculated potential energy to the potential energy summing memory is carried out (step S207). The potential energy summing memory is, for example, allocated to one part of the work memory, and the value of the calculated potential energy is sequentially added thereto. By referring to such value, a cumulative value of the potential energy previously calculated individually is obtained.

The computer apparatus 1 determines whether the present variable j is the maximum value j max (step S208), and if the result is false, 1 is added to the variable j (step S209) and steps S204 to S207 are again repeated. More specifically, the potential energy between the $i^{th}$ number of carbon atom model of the first filler model Fm1, and the second carbon atom model and onwards of the second filler model Fm2 is sequentially calculated, and this value is sequentially added to the potential energy summing memory.

If the determination result of step S208 is true, the potential energy in the combination of the first carbon atom model of the first filler model Fm1 and all the carbon atom models of the second filler model Fm2 is calculated. In this case, a determination is made whether the variable i is the maximum value i max (step S210), and if the result is false, 1 is added to the variable i (step S211), the variable j is initialized to 1 (step S203) and a loop of steps S204 to S209 is again repeated.

If the determination result of step S210 is true, the potential energy in the combination of all the carbon atom models of the first filler model Fm1 and all the carbon atom models of the second filler model Fm2 is calculated, and the sum thereof is obtained.

It is very effective in evaluating the interactions to change the distance r between the first filler model Fm1 and the second filler model Fm2 to a different value and to obtain and compare the interactions in each state. Thus, in this embodiment, the initial value of distance r is set to 0.3 nm, and is changed to the maximum value r max of 1.2 nm by an increment α of 0.001 nm. More specifically, a determination is made whether the distance r between the first and the second filler model Fm1, Fm2 is the maximum value r max (step S212), and if the result is false, the increment α (0.001 nanometer in the example) of the distance is added to the distance r (step S213).

After writing and storing the value of the potential energy summing memory to a magnetic disc and the like as the sum of the potential energy of the present distance r, the values of the potential energy summing memory is cleared (step S214, S215). Thereafter, the sum of the potential energy is again calculated with distance r added with increment α. On the other hand, if the present distance r is determined as the maximum value r max in step S212, the process is finished. The procedure then returns to step S300 of FIG. 26.

From the above processes, the sum of the individual potential energy obtained from all the combinations of the carbon atom model 12 of the first filler model Fm1 and the carbon atom model 12 of the second filler model Fm2 is obtained for each different distance. Thus, a stable distance between the filler models having the smallest potential energy can be studied.

Figure 33:
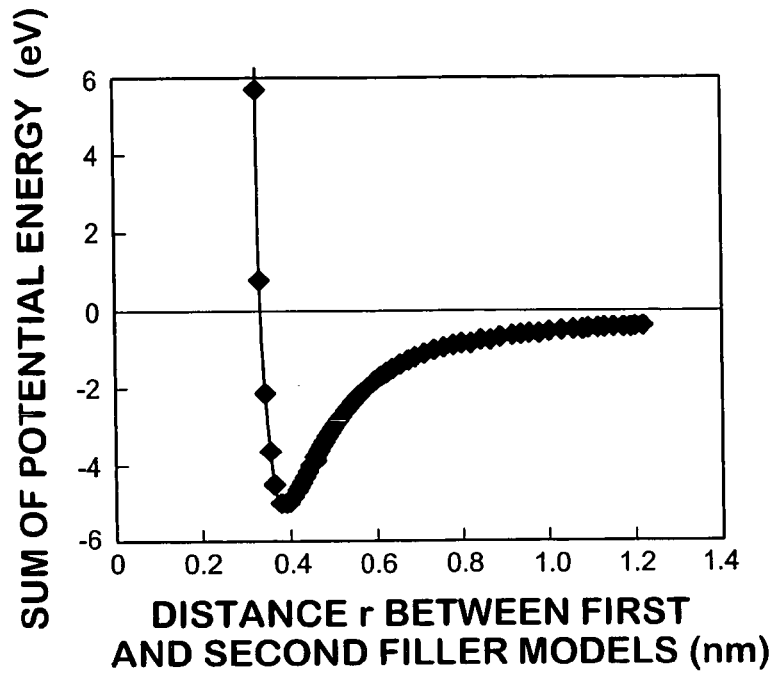
FIG. 33 is a graph showing a relationship between the distance between the filler models and the sum of potential energy.
Figure 34:
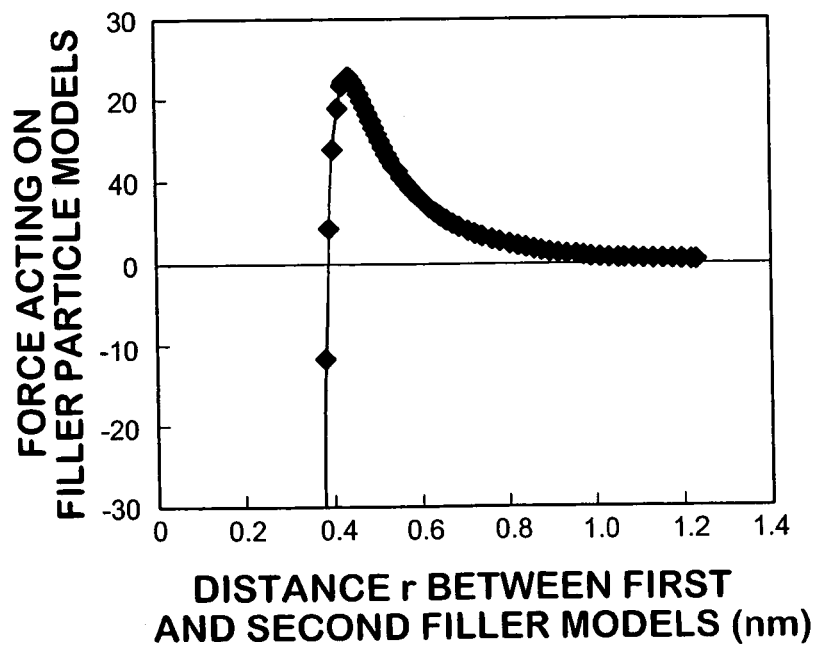
FIG. 34 is a graph showing a relationship of the distance between the filler models and the force acting on the filler models.
Figure 35:
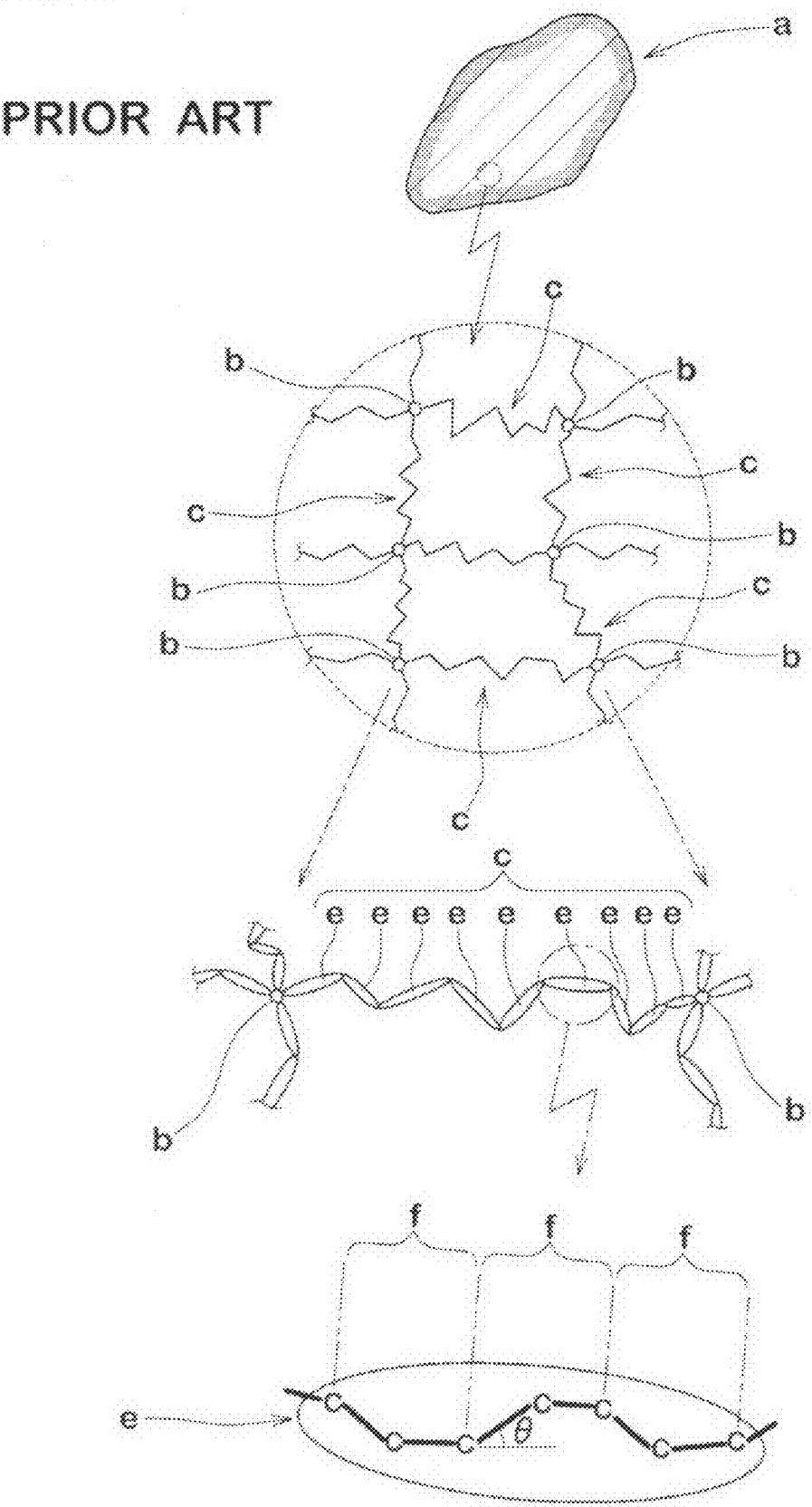
FIG. 35 is an enlarged view of the viscoelastic material, one structure of molecular chain thereof, an enlarged molecular chain, and an enlarged segment.

In FIG. 33, a graph in which the distance r between the first and the second filler model Fm1, Fm2 is shown on the horizontal axis, and the sum of the potential energy is shown on the vertical axis is shown as the result of the calculation step. In FIG. 34, a graph in which the distance r between the first and the second filler model Fm1, Fm2 is shown on the horizontal axis, and the force acting between the filler models is shown on the vertical axis is shown. The graph of FIG. 34 can be obtained by differentiating the curve of FIG. 33. As apparent from the figures, the force acting between the first and the second filler models Fm1, Fm2 is substantially zero when the distance r between the first and the second filler models Fm1, Fm2 is approximately 0.39 nm.

The present embodiment is useful in clearly understanding the interaction of the relevant fillers of the rubber composition filled with, for example, filler. By controlling the bonding of the filler and the rubber, the distance (dispersibility) between the fillers can be adjusted. Therefore, based on the calculation result of the interaction between the fillers, the dispersibility of the filler and the rubber is adjusted, and is useful in providing energetically stable filler filled rubber. Further, since the filler particle takes filler atom into consideration, a more suitable calculation result can be derived.

It should be apparent to those skilled in the art that the present invention may be embodied in many other specific forms without departing from the spirit or scope of the invention. Therefore, the present invention is not to be limited to the details given herein, but may be modified within the scope and equivalence of the appended claims.

The invention claimed is:

1. A method of simulating deformation of a viscoelastic material in which filler is blended to a matrix made of resin or rubber, the method comprising the steps of:
dividing the viscoelastic material into a finite number of elements to form a viscoelastic material model; the step of dividing including the steps of
dividing the matrix into a finite number of elements to form a matrix model,
dividing at least one filler into a finite number of elements to form a filler model, and
disposing an interface model surrounding the filler model between the matrix model and the filler model, the interface model having a viscoelastic property being different from the matrix model and having a thickness of from 1 to 20 nm;
wherein the matrix model is defined with a relationship of stress and strain expressed as:

$$\overset{\triangledown}{S}_{ij} = -p\delta_{ij} + R_{ijkl}\dot{\varepsilon}_{kl} \text{ where}$$

$$R_{ijkl} = \frac{1}{3}C^R\sqrt{N}\left\{\left(\frac{\xi_c}{\sqrt{N}} - \frac{\beta_c}{\lambda_c}\right)\frac{B_{ij}B_{kl}}{B_{mm}} + \frac{\beta_c}{\lambda_c}(\delta_{ik}B_{jl} + B_{ik}\delta_{jl})\right\}$$

$$C^R = n \cdot k_B \cdot T$$

(n: number of molecular chains per unit volume; $k_B$: Boltzmann constant; T: absolute temperature)

N: average segment number per one molecular chain $$\xi_c = \frac{\beta_c^2}{1 - \beta_c^2 \csc h^2 \beta_c} \quad \dot{p} = -K\dot{\varepsilon}_{mm} \quad K = \psi \max(R_{ijkl})$$

$$\beta_c = L^{-1}\left(\frac{\lambda_c}{\sqrt{N}}\right) \quad \lambda_c^2 = \frac{1}{3}(\lambda_1^2 + \lambda_2^2 + \lambda_3^2)$$

$\lambda_1^2 + \lambda_2^2 + \lambda_3^2 = I_1$, $I_1$; primary invariable quantity of strain
$B_{ij}$: left Cauchy-Green deformation tensor
performing deformation calculation of the viscoelastic material model based on a predetermined condition;
acquiring physical amount from the deformation calculation; and
providing a display of the physical amount.

2. The method of simulating the viscoelastic material as claimed in claim 1, wherein the interface model has a viscoelastic property softer than the matrix model.

3. The method of simulating the viscoelastic material as claimed in claim 1, wherein the interface model has a viscoelastic property harder than the matrix model.

4. The method of simulating the viscoelastic material as claimed in claim 1, wherein the interface model has a viscoelastic property in which a hysteresis loss is greater than the matrix model.

5. The method of simulating the viscoelastic material as claimed in claim 1, wherein an average segment number N per one molecular chain is defined as a parameter that is different in the time of loaded deformation and unloaded deformation of the viscoelastic material model to simulate an energy loss of the matrix rubber.

6. The method of simulating the viscoelastic material as claimed in claim 5, wherein the average segment number N increases with a parameter relating to strain during the loaded deformation, and is a constant value during the unloaded deformation.

7. The method of simulating the viscoelastic material as claimed in claim 6, wherein the parameter relating to strain is any one of a primary invariable $I_1$ of strain, strain, or strain velocity.

8. The method of simulating the viscoelastic material as claimed in claim 1, wherein the filler model includes at least two filler models of a first filler model and a second filler model arranged separated by a distance, and the step of dividing the viscoelastic material into a finite number of elements includes a step of arranging an inter-filler model having an inter-filler attractive force, which changes with the distance, between the first filler model and the second filler model.

9. The method of simulating the viscoelastic material as claimed in claim 8, further including a step of determining the inter-filler attractive force based on a function for a parabolic curve including a gradually increasing region that smoothly increases and reaches a peak with an increase in the distance between the first filler model and the second filler model, and a gradually decreasing region that smoothly decreases and reaches zero at a predetermined characteristic length with a further increase in the distance.

10. The method of simulating the viscoelastic material as claimed in claim 9, further comprising the step of linearly decreasing the inter-filler attractive force from a value of start of unloading to zero in the unloaded deformation from the gradually decreasing region to express the hysteresis loss between the first filler model and the second filler model.

* * * * *